Figure 1A:
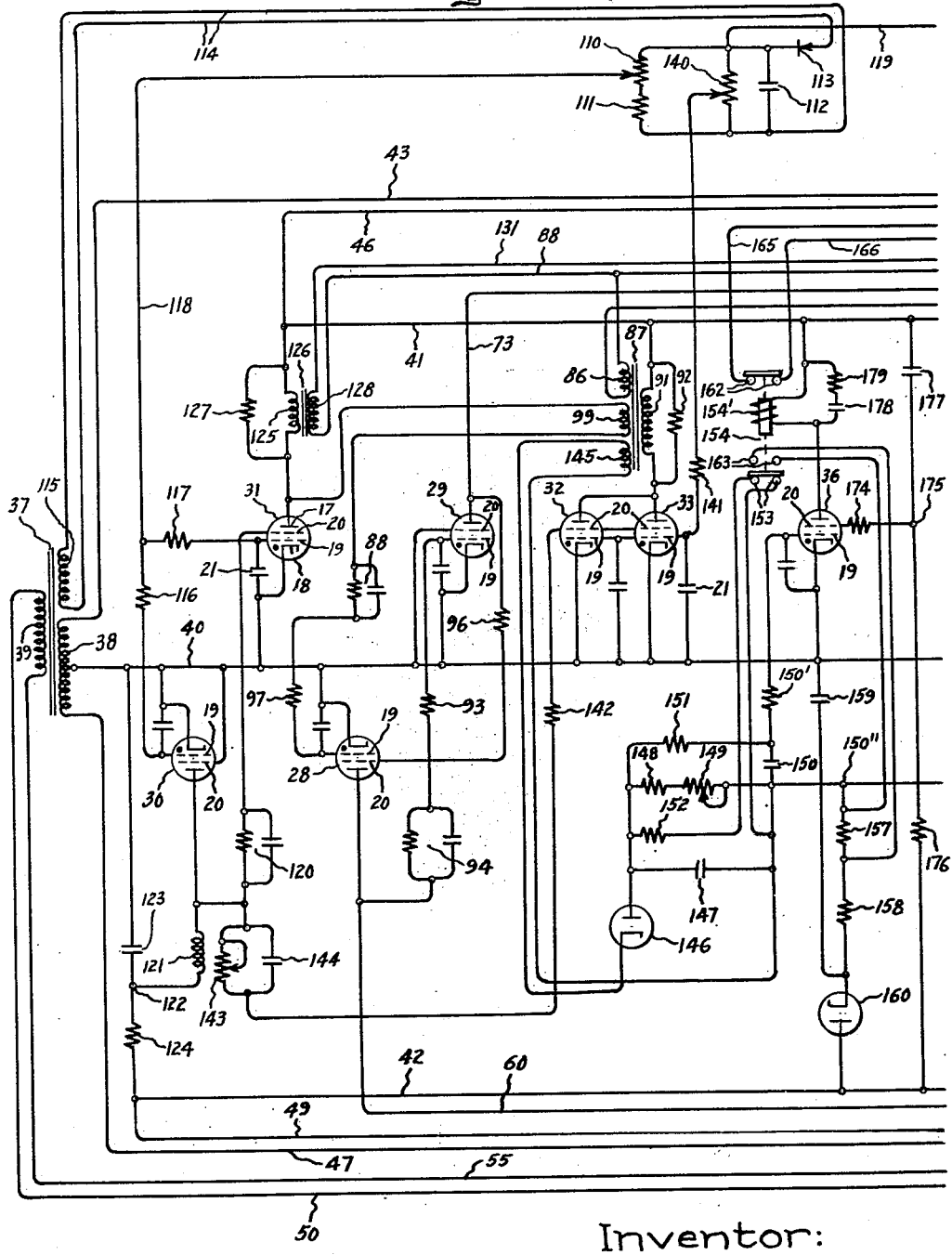

March 10, 1953 — M. E. BIVENS — 2,631,267
PROTECTIVE CONTROL CIRCUITS
Filed Aug. 17, 1950 — 3 Sheets-Sheet 1

Inventor:
Maurice E. Bivens,
by Claude A. Mott
His Attorney.

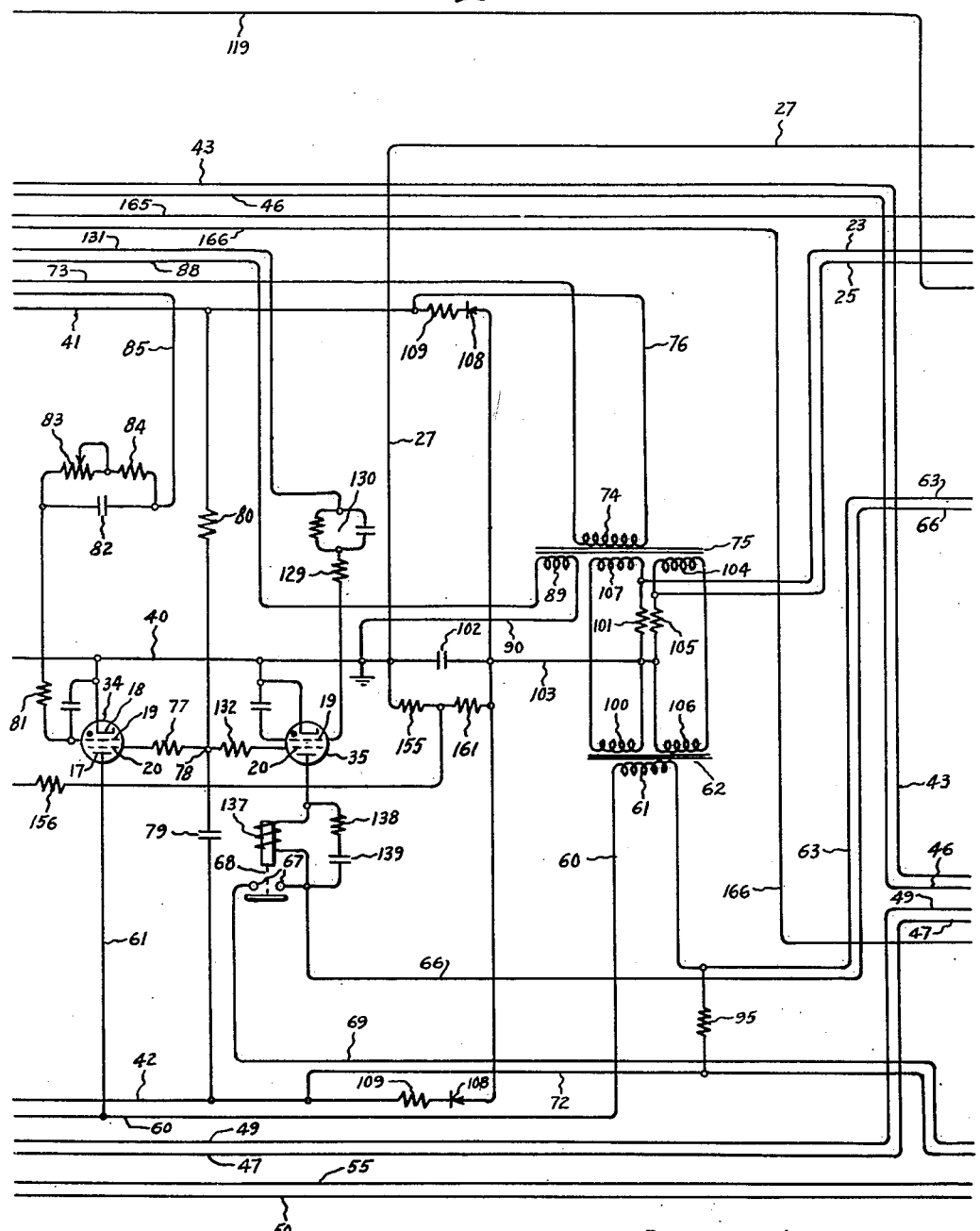

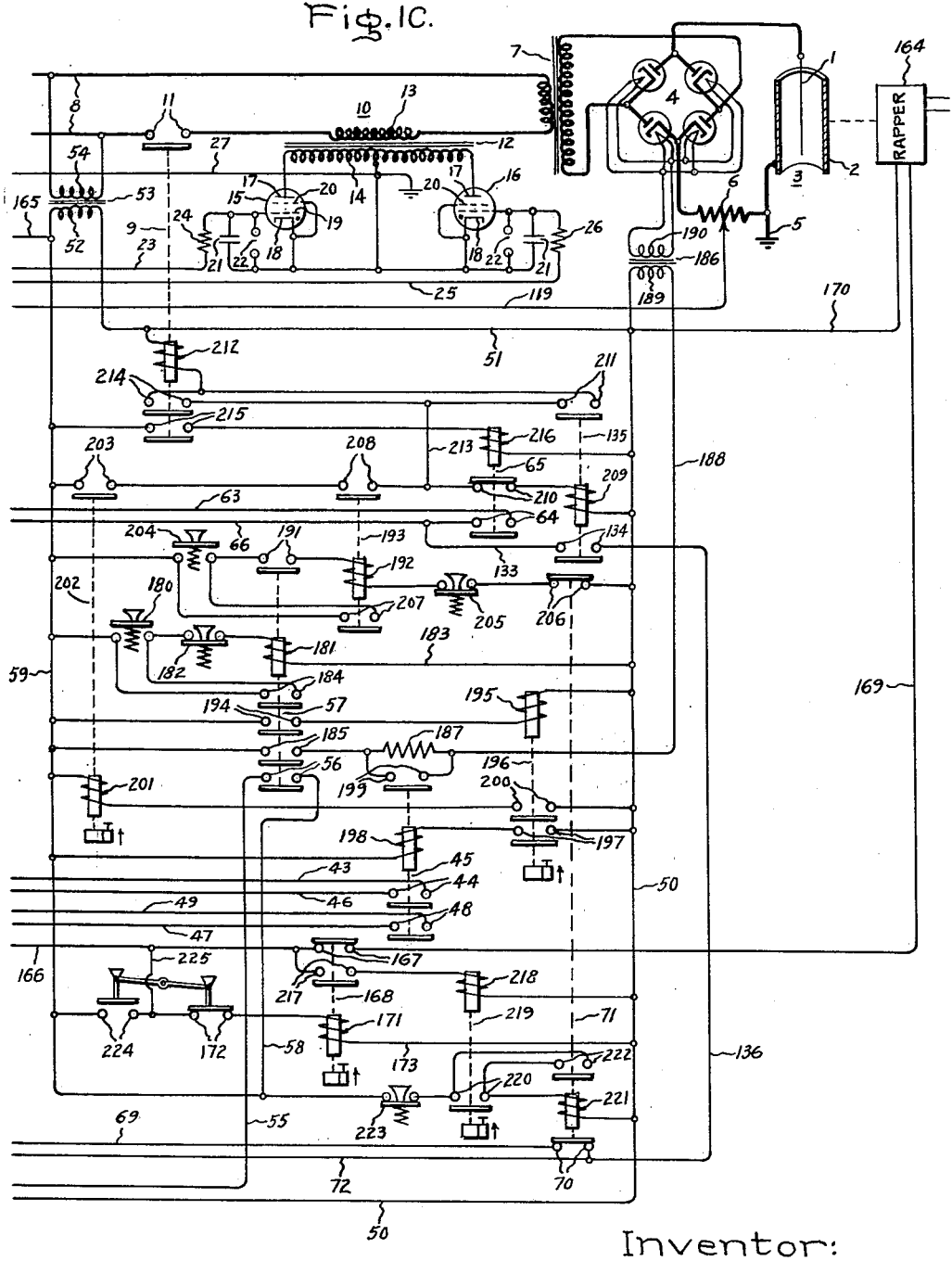

Patented Mar. 10, 1953

2,631,267

UNITED STATES PATENT OFFICE 2,631,267

PROTECTIVE CONTROL CIRCUITS

Maurice E. Bivens, Schenectady, N. Y., assignor to General Electric Company, a corporation of New York Application August 17, 1950, Serial No. 179,965

24 Claims. (Cl. 321—13)

My invention relates to protective control circuits and, more particularly, to protective control circuits for rectifier systems such as may be used to energize electrostatic precipitators.

Electrostatic precipitators have many applications, for example, removal of fly ash from flue gases and removal of valuable material suspended in gases resulting from industrial processes or conversely providing clean air for use in industrial processes by removing contaminating particles therefrom. These precipitators may be of several types, but in each case have one or more discharge electrodes and one or more collecting electrodes. The gas to be treated is passed between these electrodes and the solid matter in this gas is deposited on the collecting electrode or electrodes from which it is periodically removed. This removal may be accomplished by a rapper mechanism which acts on the collecting electrode or electrodes to jar the deposit therefrom.

These precipitators are low current, high voltage, direct current devices and operate most efficiently at a voltage level which is just below the value at which arcing occurs between the electrodes. Consequently, some arrangement must be provided for preventing damage to the electrical equipment as well as to the precipitator whenever arc-overs occur in the precipitator. Various means may be provided for limiting this surge current, such as employing a power transformer with high leakage or by connecting a resistor or inductance in the input or output circuit of the rectifier employed for supplying voltage to the precipitator. Such arrangements, however, are not as desirable as a constant voltage arrangement wherein no provision is made for obtaining the drooping voltage characteristic resulting from the arrangements above specified. However, when a constant voltage arrangement is employed, it is necessary to provide a control which will very promptly shut down the system in case of overloads such as may result from arc-overs in the precipitator.

Where a full wave rectifier is employed for supplying direct current to the precipitator, it is also desirable, in the interests of economy, to operate the rectifier as near as possible to its full load capacity. With such an arrangement, however, partial failure of the rectifier resulting in half wave rectification will overload that part of the rectifier still functioning because the precipitator is essentially a capacitance load and with half wave rectification the greater leakage time thus provided results in a greater current demand on that portion of the full wave rectifier which is supplying this half wave energization of the precipitator. It is, consequently, desirable to provide the precipitator control with means responsive to a skip in half cycles of rectifier output for shutting down the control when such partial operation of the full wave rectifier takes place.

It is also desirable to have a control which will always fail safe, so that if any component part thereof does fail, the system will shut down and thus avoid any possibility of damage due to undesired operation or faulty operation of the system resulting therefrom.

It is an object of my invention to provide an improved control circuit which will promptly interrupt the flow of load current whenever this load current is above or below a predetermined safe value.

It is also an object of my invention to provide an improved control circuit which will automatically re-initiate its operation a predetermined time after shut down resulting from over- or under-current flow in the load circuit.

It is another object of my invention to provide an improved control circuit which will interrupt the supply of load current whenever the frequency at which overloads occur is greater than a pre-established rate.

It is also an object of my invention to provide a control circuit in which dependable operation is insured by the arrangement of its component parts.

Further objects of my invention will become apparent from the embodiment thereof illustrated in Figs. 1A, 1B, and 1C which, when placed side by side in the order stated, diagrammatically represent my invention as applied to the control of a full wave rectifier having its input terminals connected to a source of alternating current supply and its output terminals connected to the electrodes of an electrostatic precipitator.

In accordance with the illustrated embodiment of my invention, current is supplied through load conductors to the electrodes of an electrostatic precipitator by a full wave rectifier whose connection with alternating current supply conductors is determined by a circuit controlling means. This circuit controlling means is operated to supply current to the rectifier by the alternate conduction in leading and trailing fashion of a pair of electric discharge devices which, for convenience, will be identified as load current flow controlling electric discharge devices. If either of these electric discharge devices of this pair fail to conduct, the circuit controlling means is operated to prevent the flow of work current through the rectifier to the precipitator.

Conduction of this pair of electric discharge devices is initiated by conduction of an electric discharge device which is rendered non-conductive for a predetermined time interval depending on conduction of the trailing load current flow controlling electric discharge device of this pair which is initially rendered conducting thereby and thereafter rendered conducting by conduction of the leading electric discharge device of this pair. Thus, if current flow through the load current flow controlling electric discharge devices is interrupted, this current initiating electric discharge device cannot re-initiate conduction of this pair until after the expiration of a predetermined time delay.

Continued operation of this pair of load current flow controlling electric discharge devices is made dependent upon the sequential conduction in trailing fashion of another pair of control electric discharge devices each of whose conductivity is made dependent upon the flow to the precipitator of rectified current greater than a predetermined minimum. Thus, the conductivity of the trailing control electric discharge device is dependent on prior conductivity of the leading control electric discharge device and conductivity of both is dependent on the flow of consecutive positive and negative half cycles of rectified current flow in the load circuit. If the trailing electric discharge device of this control pair fails to conduct, the leading electric discharge device of the current flow controlling pair of electric discharge devices will not conduct and the circuit controlling means will be operated to prevent the flow of work current to the precipitator until reoperated by their renewed conduction after the time delay imposed by the current initiating electric discharge device. A skip of a half cycle of rectified current flow in the load circuit of the rectifier will consequently operate through these control electric discharge devices to interrupt conduction through the pair of load current flow controlling electric discharge devices.

The continued flow of current through the pair of load current flow controlling electric discharge devices is also interrupted whenever an overload electric discharge device becomes conducting and applies a hold-off voltage to the leading electric discharge devices of this pair. This overload electric discharge device is prevented from operating for a predetermined time interval each time the system is set in operation so as to prevent overload response during the period of time required for charging the precipitator and its circuit which constitutes a capacitance load and, as such, will draw overload current while being charged each time the system is set in operation.

If the frequency of overload current interruptions is greater than a predetermined rate, the repeated operation of the overload electric discharge device will alter the conductivity of another electric discharge device which is responsive to this frequency of overload. The alteration in conductivity of this frequency of overload electric discharge device will initially operate a rapper which acts to clear deposits from the collecting electrode of the precipitator and, after a predetermined time delay, will shut down the system if the frequency of overload does not decrease to below the predetermined rate.

Each time there is a skip in the rectified half cycles of the load current flow, another electric discharge device operates to shut the system down. This shut down electric discharge device has its conductivity altered in accordance with the failure of the trailing one of the pair of control electric discharge devices to operate whenever such skip occurs, thereby permitting the trailing one of the pair of load current flow controlling electric discharge devices by its conduction to operate on the shut down electric discharge device to alter its conductivity.

A detailed description of my control will now be given with reference to the diagrammatic representation of the embodiment illustrated in Figs. 1A, 1B and 1C of the drawings.

As shown in the upper Fig. 1C portion of these drawings, the discharge electrode 1 and the collecting electrode 2 of an electrostatic precipitator 3 are respectively connected to the output terminals of a power rectifier 4. The collecting electrode 2 of this precipitator is connected to ground at 5 and a potentiometer 6 is connected in that one of the load circuit conductors extending from one of the output terminal of the rectifier to the collecting electrode 2 of the precipitator.

The input terminals of the rectifier 4 are respectively connected to the secondary terminals of a constant high voltage power transformer 7 whose primary is connected to supply conductors 8 through a plurality of circuit controlling means one of which is a magnetic contactor 9 and the other of which is a controllable impedance 10. When the contacts 11 of the magnetic contactor 9 are closed, the voltage applied to the primary of the power transformer 7 depends on the impedance value of the controllable impedance 10.

As shown, this controllable impedance is a series transformer 12 having its primary 13 series connected between the supply conductors 8 and the primary of the power transformer 7. The secondary 14 of this series transformer 12 is provided with end terminals which are connected through electric discharge devices 15 and 16 to a mid tap thereof which as illustrated may be grounded. Whenever the electric discharge devices 15 and 16 are conducting the secondary of the series transformer 12 is shorted and this reduces the impedance of its primary winding to a low value so that substantially the full voltage of the supply conductors is applied to the terminals of the primary winding of the power transformer 7. When the electric discharge devices 15 and 16 are nonconducting, the secondary 14 of the series controlling transformer is open circuited and the impedance of its primary winding 13 is a maximum and absorbs practically the full voltage of the supply conductors 18 so as effectively to deenergize the power transformer 7 and the rectifier 4 fed therethrough which of course deenergizes the precipitator 3 by reducing to a very low value or zero the work current supplied thereto.

Each of the electric discharge devices 15 and 16 is provided with an anode 17, a cathode 18 and a plurality of control elements 19 and 20, all of which are enclosed within an envelope which may contain an ionizable gas or vapor as is indicated by the dot associated with their cathodes. The short circuiting connection for the secondary 14 of the series transformer 12 above described is completed through the anode-cathode circuits of these electric discharge devices. Protection is provided against faulty operation of the electric discharge devices due to anode voltage surges by capacitors 21 connected between control elements 19 and cathodes 18 of these electric discharge devices. Spark gaps 22 likewise connected are also provided for protection against over-voltage between control element 19 and cathode 18 due to anode voltage surges.

Control elements 20 of electric discharge devices 15 and 16 are directly connected to their cathodes 18 and their control elements 19 are respectively connected in control element circuits including a conductor 23 and a current limiting resistor 24 and a conductor 25 and a current limiting resistor 26. This control circuit also includes a conductor 27 which is connected to the cathodes 18 of these electric discharge devices.

The conductivity of electric discharge devices 15 and 16 is directly controlled by a pair of electric discharge devices 28 and 29, a second pair of electric discharge devices 30 and 31 and electric discharge devices 32, 33 and 34 and indirectly controlled by the conductivities of electric discharge devices 35 and 36. Each of these electric discharge devices is provided with an anode and a cathode and two control elements all of which are enclosed within an envelope preferably containing an ionizable gas or vapor as indicated by the dots associated with their cathodes. These anodes, cathodes and control elements have been identified by the same reference numbers 17, 18, 19 and 20 employed for identifying like elements of electric discharge devices 15 and 16 above described. Also, as disclosed above in connection with electric discharge devices 15 and 16, control elements 19 of each of the electric discharge devices 28—36 are connected to their cathodes 18 by a transient suppressing capacitor 21.

Electric discharge devices 28—36 have already been identified above in the general description in accordance with their primary functions. Thus, the pair of electric discharge devices 28 and 29 have been identified as load current flow controlling electric discharge devices, the pair 30 and 31 as control electric discharge devices, 32 and 33 as overload electric discharge devices, 34 as a current initiating electric discharge device, 35 as a shut-down electric discharge device, and 36 as a frequency of overload electric discharge device.

Anode-cathode voltage is supplied to the electric discharge device 28—36 by a transformer 37 having a mid tap secondary winding 38 and a primary winding 39. Each of the cathodes 18 of electric discharge devices 28—36 is directly connected to a conductor 40 which is connected to the mid tap terminal of the secondary winding 38 of transformer 37. The anodes of these electric discharge devices are connected to conductors 41 and 42 through circuits which will later on be described in detail. Conductor 41 is connected to the upper end terminal of the secondary 38 of transformer 37 through a conductor 43, contacts 44 of relay 45 and a conductor 46. Conductor 42 is connected with the lower end terminal of secondary 38 of transformer 37 through a conductor 47, contacts 48 of relay 45 and a conductor 49. Thus, when conductor 41 is at positive polarity relative to conductor 40, conductor 42 will be at negative polarity and vice versa. Consequentially, electric discharge devices 31, 29, 32, 33 and 36 are connected for conduction during one polarity of the supply voltage and electric discharge devices 30, 28, 34 and 35 are connected for conduction during the other polarity of this supply voltage. This voltage is derived from the supply conductors 8 by connecting the upper terminal of the secondary 39 of transformer 37 through conductors 50 and 51 to one of the terminals of the secondary 52 of a control circuit transformer 53 whose primary 54 is connected across the supply conductors 8 and by connecting the lower terminal of primary 39 of transformer 37 through a conductor 55, contacts 56 of a relay 57 and conductors 58 and 59 to the other terminal of the secondary 52 of transformer 53.

The anode-cathode circuits of electric discharge devices 30, 31, 28, 29, 32, 33 and 34 are completed through inductive circuits so that once these discharge devices have been rendered conducting during positive half cycles of their anode voltage, current flow continues over into the next negative half cycle producing a voltage drop thereacross from anode to cathode of these devices which is used as a control voltage for other electric discharge devices whose anode voltage is positive during this next half cycle. This will become apparent as the description proceeds.

The anodes of electric discharge devices 28 and 34 are connected together by conductors 60 and 61 and through conductor 60, the primary 61 of a control transformer 62, conductor 63, contacts 64 of a relay 65, conductor 66, contacts 67 of a relay 68, conductor 69, contacts 70 of a relay 71 and conductor 72 to conductor 42 previously described as energized by the secondary 38 of transformer 37. The anode of electric discharge device 29 is connected through conductor 73, the primary 74 of a control transformer 75 and conductor 76 to conductor 41 also energized by the secondary 38 of transformer 37 as above described. A control voltage is applied in the control element circuit of control element 20 of electric discharge 34 by connecting it through a current limiting resistor 77 to terminal 78 of a phase shift circuit comprising a capacitor 79 and a resistor 80 which are connected in series with one another across conductors 41 and 42. The arrangement is such that the electric discharge device 34 is released for conduction by its control element 20 only during the early part of a half cycle of its positive anode voltage. The other control element 19 of electric discharge device 34 is connected with its cathode through a current limiting resistor 81, a timing circuit including a capacitor 82 and its parallel connected adjustable resistance 83 and fixed resistance 84, conductor 85, a secondary 86 of a control transformer 87, conductor 88, a secondary 89 of control transformer 75 and conductor 90 to conductor 40 which is, as previously described, directly connected to the cathode of this electric discharge device. The primary 91 of control transformer 87 and its parallel connected resistor 92 is connected through the anode-cathode circuits of electric discharge devices 32 and 33 across conductors 40 and 41. Consequently, when either of the electric discharge devices 32 and 33 or electric discharge device 29 conduct, they energize the primary 91 of control transformer 87 or the primary 74 of control transformer 75 to charge the capacitor 82 in the control element circuit of control element 19 of electric discharge device 34 through the rectifying circuit completed from the control element 19 to the cathode 18 of electric discharge device 34. This applies a negative hold off voltage to control element 19 of electric discharge device 34 which cannot again conduct for a predetermined time interval thereafter which is determined by the setting of adjustable resistance 83 connected across this capacitor 82.

Anode-cathode conduction of electric discharge device 34 causes electric discharge device 29 to conduct in trailing response during the next positive half cycle of the supply voltage by reason of the voltage drop from anode to cathode of electric discharge device 34 continuing over into the next half cycle of voltage when the anode voltage of electric discharge device 29 is positive. This control voltage is applied in the control element circuit of control element 19 of electric discharge device 29 through current limiting resistor 93 and the negative self biasing circuit 94 which is connected to the anode of electric discharge device 34. The other control element 20 of electric discharge device 29 is connected directly to conductor 40 which is connected to the cathode of this electric discharge device. At the time the system is set in operation a negative bias voltage is applied in the control element circuit of control element 19 of electric discharge device 29 through resistor 93, negative self biasing circuit 94, conductor 60, secondary 61 of control transformer 62 and resistor 95 which is connected through conductor 72 to supply conductor 42. Resistance 95 is of a sufficiently high value to prevent ionization of electric discharge devices 28 and 34 when supply conductor 42 is positive and thus applies positive anode voltage to these electric discharge devices.

The control element 20 of electric discharge device 28 is connected through a current limiting resistor 96 to the anode of electric discharge device 29. As previously stated, the anode-cathode circuit of electric discharge device 29 is connected in an inductive circuit provided by the primary 74 of control transformer 75 so that anode-cathode conduction of this electric discharge device continues over into the negative half cycle and will apply a control voltage to the control element 20 of electric discharge device 28 which will render it conducting provided it is released for conduction by the control voltage applied to its control element 19. This control element voltage is furnished by the anode-cathode drop of electric discharge device 31 through a circuit including a current limiting resistor 97, a negative self biasing circuit 98 and the secondary 99 of the control transformer 87. This secondary 99 of control transformer 87 introduces a negative hold off voltage into this control element circuit whenever electric discharge devices 32 and 33 conduct thereby energizing the primary winding 91 of this control transformer 87.

Anode-cathode conduction of either one of the electric discharge devices 28 or 34 connect the primary winding 61 of control transformer 62 across supply conductors 40 and 42 to energize this transformer and induces in its secondary 100 a voltage which appears across the resistor 101 in the control element circuit of the control element 19 of electric discharge device 15. The voltage across resistor 101 is sufficient to overcome the bias voltage of capacitor 102 also connected in this control element circuit and thereby render electric discharge device 15 conducting. The control element circuit of electric discharge device 15 extends from its control element 19 through resistor 24, conductor 23, resistor 101, conductor 103, capacitor 102 and conductor 27 back to the cathode 18 of this electric discharge device 15.

In like manner, anode-cathode conduction of electric discharge device 29 connects the primary 74 of control transformer 75 across supply conductors 40 and 41 thereby energizing it and inducing in its secondary winding 104 a control voltage which appears across resistor 105 which is connected in the control element circuit of the control element 19 of electric discharge device 16. The voltage across resistor 105 is a turn on voltage sufficient to overcome the bias voltage of capacitor 102 also connected in this control element circuit. The control circuit for control element 19 of electric discharge device 16 extends from its control 19 through resistor 26, conductor 25, resistor 105, conductor 103, capacitor 102 and conductor 27 to the cathode 18 of this electric discharge device 16. Capacitor 102 above referred to is charged from the supply conductors 40, 41 and 42 through a full wave rectifier, each branch of which includes a contact rectifier 108 and a current limiting resistor 109.

Each of the control transformers 62 and 75 is provided with another secondary winding 106 and 107 respectively connected in series circuits with the secondary winding 104 and resistor 105 and secondary winding 100 and resistor 101. Thus, at the end of a half cycle during which the primaries 61 and 74 of these transformers were energized, the reversal of voltage occurring during the next half cycle is employed as a turn on voltage in the control element circuits above traced for electric discharge devices 15 and 16.

Anode-cathode conduction of electric discharge devices 30 and 31 is dependent upon current flow greater than a predetermined minimum in the load circuit connecting the precipitator 3 to the output terminals of the rectifier 4. This result is obtained by connecting in the control element circuits of control elements 19 of these electric discharge devices a voltage derived from the potentiometer 6 which is connected in the load circuit. The predetermined minimum value specified is determined by the adjustment of the slider on a potentiometer 110 which is connected through a fixed resistance 111 across a capacitor 112 whose top terminal is charged to a positive polarity by current supplied through rectifier 113 and conductors 114 which are connected to another secondary winding 115 of transformer 37. The control element circuits of each of these electric discharge devices 30 and 31 extends from their control elements 19 through current limiting resistors 116 and 117, conductor 118, the upper portion of potentiometer 110, conductor 119, the right-hand portion of potentiometer 6, and ground connection 5 to conductor 40 which is also grounded. It may prove desirable to provide a direct metallic connection between conductor 40 and the ground terminal of potentiometer 6 in order to insure the effectiveness of the control voltages introduced in these control element circuits by the potentiometers referred to. It will be noted that the potentiometer 6 provides a positive turn on voltage which must be greater than the negative hold off voltage of potentiometer 110 before the electric discharge devices 30 and 31 are released for conduction.

Anode-cathode conduction of electric discharge device 31 also depends on the voltage applied to its control element 20. This control element is connected to the cathode of this electric discharge device through a circuit including the negative self biasing circuit 120 and the anode-cathode circuit of electric discharge device 30. Thus, the anode-cathode drop across electric discharge device 30 will render electric discharge device 31 conducting in the next half cycle after electric discharge device 30 was rendered conducting. This follows for reasons noted above as a direct result of the connection of inductance 121 in the anode-cathode circuit of electric discharge device 30. For purposes that will later appear, conduction is made to extend to or slightly beyond the 90° point of the next half cycle following a conduction period for electric discharge device 30 by connecting the anode of this electric discharge device through inductance 121 to the terminal 122 of a phase shift circuit provided by connecting capacitor 123 and resistor 124 in series across the supply conductors 40 and 42. Control element 19 of electric discharge device 30 is connected directly to its cathode and consequently conduction of this electric discharge device depends solely on the voltage applied to its control element 20 by means of the circuit above described.

Anode-cathode conduction of electric discharge device 31 connects the primary 125 of control transformer 126 across the supply conductors 40 and 41. This primary winding 125 is shunted by a resistance 127. When the primary winding 125 of transformer 126 is energized, a voltage is induced in its secondary winding 128 which is sufficient to overcome the voltage induced into the secondary 89 of control transformer 75 when the anode-cathode circuit of electric discharge device 29 is completed at the same time. These windings are connected in series with one another in the control circuit of control element 19 of electric discharge device 35. This control element circuit for electric discharge device 35 extends from its control element 19 through current limiting resistor 129, negative self biasing circuit 130, conductor 131, secondary winding 128 of control transformer 126, conductor 88, secondary winding 89 of control transformer 75 and conductor 90 to the cathode of this electric discharge device 35. Electric discharge device 35 has its other control element 20 connected through a current limiting resistance 132 to terminal 78 of the phase shift circuit 79, 80 which as in the case of electric discharge device 34 only permits conduction of electric discharge device 35 to be initiated during the early part of a positive half cycle of its anode voltage. Thus, if the electric discharge device 31 fails to conduct at a time when electric discharge device 29 does conduct the electric discharge device 35 will be rendered nonconducting. Electric discharge device 31 conducts in trailing response to conduction of electric discharge device 30 and both of these electric discharge devices fail to conduct if the load conductor current flow is less than a predetermined minimum. Thus, a skip in half cycles of rectified current of the power rectifier 4 will cause electric discharge device 35 to become nonconducting. This skip may be caused by failure of one of the electric discharge devices in the rectifier.

Electric discharge device 35 became conducting when its anode-cathode circuit across supply conductors 40 and 42 was completed through conductors 66 and 133, contacts 134 of relay 135 and conductors 136 and 72. As will appear later when this connection is completed by closure of contacts 134 of relay 135 control transformers 75 and 126 are deenergized so that there is no control voltage in the circuit of control element 19 of this electric discharge device 35 and consequently it becomes conducting early in the cycle of its positive anode voltage as a result of the control voltage applied to its control element 20.

This anode-cathode conduction of electric discharge device 35 energizes the operating winding 137 of relay 68 resulting in the closure of its contacts 67. To prevent chattering of this relay 68 a smoothing circuit consisting of a series connected resistor 138 and capacitor 139 is connected across its operating winding 137.

Anode-cathode conduction of electric discharge devices 32 and 33 depends on the voltage applied to their control elements 19 and 20. Their control elements 19 are connected to be responsive to current flow in the load circuit of the precipitator which is greater than a predetermined value. This is accomplished by connecting in the control element circuits of these control elements 19 the voltages of potentiometers 140 and 6. The control element circuits for control elements 19 of electric discharge devices 32 and 33 extend from the control elements through a current limiting resistor 141, the upper portions of potentiometer 140, conductor 119, and the right-hand portion of potentiometer 6 to ground 5 and thence to conductor 40 which is also grounded and connected with the cathodes of these electric discharge devices. Potentiometer 140 is connected across capacitor 112 and provides a negative hold off voltage which is overcome by the positive turn on voltage provided by potentiometer 6 when the load current flow is greater than a predetermined maximum.

As previously stated, each time the precipitator 3 is connected for energization, the charging current may be greater than the normal full load current supplied thereto. Thus, it is desirable to prevent the electric discharge devices 32 and 33 responding to the signal applied to their control elements 19 during this charging period. This is accomplished by connecting their control elements 20 through a current limiting resistor 142 and a timing circuit comprising a parallel connected adjustable resistor 143 and a capacitor 144, to the anode of electric discharge device 30. Thus, when electric discharge device 30 is nonconducting, the capacitor 144 of the timing circuit will be charged through the control element to cathode circuits of electric discharge devices 32 and 33 when supply conductor 42 is positive and this will apply a negative hold off voltage to these control elements 20 of electric discharge devices 32 and 33 for a predetermined time interval after electric discharge device 30 becomes conducting. The length of this time interval will depend on the adjustment of resistance 143 which controls the discharge rate of capacitor 144.

Each time electric discharge devices 32 and 33 become conducting, a voltage is induced in the secondary 145 of control transformer 87 and this voltage is rectified by rectifier 146 to apply a charge to a storage capacitor 147. A discharging circuit for capacitor 147 is provided through a fixed resistor 148 and an adjustable resistor 149 which are series connected across the capacitor so that its charge depends upon the frequency of anode-cathode conduction of electric discharge devices 32 and 33 which, of course, as previously stated depend on overload current flow in the load conductors connected to the precipitator. The storage capacitor 147 applies a charge to a control capacitor 150 through a charging circuit including a resistor 151. Capacitor 147 also has a reset discharge circuit through resistor 152 which is completed through the contacts 153 of a relay 154 when this relay is deenergized. As a result of the arrangement described, the charge on control capacitor 150 will vary in accordance with the frequency of operation of the electric discharge devices 32 and 33 which are responsive to overload conditions in the precipitator load circuit.

One terminal of the control capacitor 150 is connected through a current limiting resistor 150' to control element 19 of electric discharge device 36. Its other terminal is connected to a point 150" of a voltage divider formed by series connected resistors 155, 156, 157 and 158 which are connected across a capacitor 159. Capacitor 159 is charged through a rectifier 160 connected in circuit therewith across supply conductors 40 and 42. Resistor 155 of this voltage divider is connected in series with a resistor 161 across capacitor 102. Thus, the comon terminal of resistors 155 and 156 is more negative than conductor 40. With the arrangement provided, point 150" on this voltage divider is positive relative to conductor 40 by an amount which results in anode conduction of electric discharge device 36 when there is no charge on control capacitor 150. It is to be noted that the cathode of electric discharge device 36 is connected to conductor 40 and its control element 19 is connected with this point 150" on the voltage divider through its current limiting resistor 150' and control capacitor 150.

When electric discharge device 36 becomes conducting, it connects the operating winding 154' of relay 154 across the supply conductors 40 and 41. This operates the relay to open its contacts 153 and 162 and to close its contacts 163. The opening of its contacts 153 disconnects the discharge circuit connected therethrough across storage capacitor 147 and closure of its contacts 163 shorts out resistor 157 which is one of the elements in the voltage divider above described. This increases the positive bias on the control element 19 of electric discharge device 36 thereby insuring that relay 154 operates in a positive manner. If due to frequency of overloads the control capacitor 150 is sufficiently charged to produce a resultant negative voltage in the control element circuit of control element 19 of electric discharge device 36, this electric discharge device will become nonconducting resulting in the opening of its contacts 163 and the closing of its contacts 153 and 162. The openings of its contacts 163 reinsert the resistance 157 in the voltage divider chain thereby applying a still more negative voltage to the control element 19 of the electric discharge device to insure positive operation of relay 154. The closure of contacts 153, discharges storage capacitor 147 through its discharge circuits including resistor 152. The closure of its contacts 162 completes a control circuit which energizes the rapper and rapper control indicated at 164 through a circuit extending from one terminal of the secondary 52 of control circuit transformer 53 through a conductor 165, contacts 162 of relay 154, conductor 166, contacts 167 of a relay 168, and conductors 169, 170 and 51 to the other terminal of the secondary 52 of transformer 53. It also completes a circuit through the operating winding 171 of a relay 168 through conductors 165, 166, push button contacts 172 and conductors 173, 50 and 51.

Positive operation of relay 154 is also insured by impressing on control element 20 of electric discharge device 36 a voltage which releases this electric discharge device for conduction only at the beginning of a positive half cycle of its applied anode voltage. This result is obtained by connecting its control element 20 through its current limiting resistor 174 to point 175 of the phase shift circuit comprising the resistor 176 connected in series with capacitor 177 across the supply conductors 41 and 42. A smoothing circuit consisting of series connected capacitor 178 and resistor 179 is connected across the operating winding 154' of relay 154.

The control is readied for operation by closing the "filament on" push button 180. This completes the energizing circuit for the operating winding 181 of relay 57 through the "filament off" push button 182. The energizing circuit for winding 181 of relay 57 extends from one terminal of the secondary 52 of control circuit transformer 53 through conductor 59, push buttons 180 and 182, and conductors 183, 50 and 51 to the other terminal of the secondary winding 52 of transformer 53.

When relay 57 picks up, it completes its holding circuit through its contacts 184 which are connected across the contacts of push button 180. It also closes its contacts 185 which completes a half voltage energizing circuit for the transformer 186 which supplies filament heating current to the arc discharge devices in the power rectifier 4. This circuit is completed from one terminal of the secondary 52 of control circuit transformer 53 through conductor 59, contacts 185 of relay 57, resistor 187, and conductor 188 to one terminal of the secondary 189 of the filament transformer 186 whose other terminal is connected through conductor 51 to the other terminal of the secondary 52 of the control circuit transformer 53. The secondary 190 of transformer 186 is connected to each of the filaments of the arc discharge devices in the arms of the rectifier 4.

The closure of contacts 56 of relay 57 also connects the primary 39 of transformer 38 through a circuit previously described for energization by the secondary 52 of the control circuit transformer 53. When the transformer 37 is energized, a secondary winding thereof (not shown) supplies heating current to each of the heating filaments associated with the cathodes of the electric discharge devices shown in the Figs. 1A and 1B sections of the drawings. These heating filaments and their connections with this secondary winding of transformer 37 have been omitted from the drawing in order to simplify it. The pickup of relay 57 also energizes a filament heating transformer for the filaments of electric discharge devices 15 and 16 by connecting this filament transformer across the secondary of the control circuit transformer 53. This transformer and its connections have likewise been omitted in order to simplify the drawing.

The pickup of relay 57 also closes its contacts 191 which prepare a circuit for energizing the operating winding 192 of relay 193. The pickup of relay 57 also closes its contacts 194 which connect the operating winding 195 of relay 196 for energization across the secondary 52 of control circuit transformer 53 through a circuit including conductors 59, 50 and 51.

Relay 196, as indicated in the drawing, is a time delay closing relay, and a predetermined time after its energization it picks up completing a circuit through its contacts 197 which energizes the operating winding 198 of relay 45 by connecting it across the secondary 52 of control circuit transformer 53 through conductors 59, 50 and 51. When relay 45 picks up, it closes its contacts 199 thereby shorting resistor 187 in the primary circuit of the filament transformer 186 to apply full voltage to the filaments of the rectifier 4. The pickup of relay 145 also closes its contacts 44 and 48 which through circuits previously described connect the secondary 38 of transformer 37 to the supply conductors 41 and 42, also previously described.

When relay 196 picks up after its time delay in closing, it also completes a circuit through its contacts 200 which connect the operating winding 201 of a relay 202 for energization from the secondary 52 of the control circuit transformer 53 through conductors 59, 50 and 51. This relay 202 after a time delay period closes its contacts 203.

If the start push button 204 is now closed, it will energize the operating winding 192 of relay 193 from one terminal of the secondary 52 of control circuit transformer 53 through conductor 59, start push button 204, contacts 191 of relay 57 which were closed by prior pickup of relay 57, a stop push button 205, normally closed contacts 206 of relay 71, and conductors 50 and 51 to the other terminal of the secondary 52 of transformer 53. Pickup of relay 193 will close its contacts 207 to complete its holding circuit around the contacts of start push button 204. Upon pickup, this relay will also close its contacts 208 completing the circuit for the operating winding 209 of relay 135 from one terminal of the secondary 52 of control circuit transformer 53 through conductor 59, contacts 203 of relay 202 closed by prior operation of relay 202, normally closed contacts 210 of relay 65, and conductors 50 and 51 to the other terminal of the secondary 52 of transformer 53.

Pickup of relay 135 will close its contacts 134 completing the anode-cathode circuit previously traced for electric discharge device 35. It will also close its contacts 211 which will complete the energizing circuit for the operating winding 212 of the line contactor 9 through a circuit extending from one terminal of the secondary 52 of control circuit transformer 53 through conductor 59, contacts 203 of relay 202, contacts 208 of relay 193, conductor 213, its own contacts 211, and conductor 51 to the other terminal of the secondary 52 of transformer 53.

When contactor 9 picks up, it closes its contacts 11 thereby completing a circuit through controllable impedance 10 for energizing the primary of power transformer 7 from the supply conductors 8. The pickup of contactor 9 also closes its contacts 214 to complete its holding circuit independently of the contacts 211 of relay 135. The pickup of contactor 9 also closes its contacts 215 which completes the energizing circuit for winding 216 of relay 65 across the secondary 52 of control circuit transformer 53 through conductors 59, 50 and 51. Pickup of relay 65 drops out relay 135 by opening its energizing winding at contacts 210. The pickup of relay 65 also closes its contacts 64 which completes the anode-cathode circuit of electric discharge devices 34 and 28 through the primary 61 of control transformer 62 in the manner previously described.

It has been previously described how dropout of relay 154 controlled by electric discharge device 36 completed the operating circuit of the rapper and its control 164 as well as the energizing circuit for winding 171 of relay 168. A predetermined time after this latter circuit has been completed, relay 168 picks up and opens its contacts 167 to deenergize the rapper and its control 164. Pickup of relay 168 also closes its contacts 217 to connect the operating winding 218 of time delay relay 219 to the circuit extending from one terminal of the secondary 52 of control circuit transformer 53 through conductor 165, contacts 162 of relay 154, and conductors 166, 50 and 51 to the other terminal of the secondary 52 of transformer 53.

After a predetermined time interval, time delay relay 219 closes its contacts 220 to energize the operating winding 221 of relay 71 from one terminal of the secondary 52 of control circuit transformer 53 through conductors 59, 50 and 51 to the other terminal of this secondary of the control circuit transformer 53. When relay 71 picks up, it opens its contacts 70 which are in the anode-cathode circuit of electric discharge device 35 thereby deenergizing this electric discharge device and the relay 68 whose winding 137 is connected in circuit therewith. Pickup of relay 71 also opens its contacts 206 which will deenergize relay 193, which will drop out opening the energizing circuit of contactor 9 which also drops out opening the circuits through its several contacts. Pickup of relay 71 also closes its contacts 222 completing a holding circuit which may be opened by operating a release push button switch 223.

Provision is made for manual operation of the rapper and its control 164. This is accomplished by closing the contacts 224 of a push button switch which completes the control circuit for the rapper from one terminal of the secondary 52 of the control circuit transformer 53 through conductors 59 and 225, contacts 167 of relay 168, and conductors 169, 170 and 51 to the other terminal of the secondary 52 of the transformer 53. The push buttons controlling contacts 172 and 224 are interlocked so that closure of one opens the other, and vice versa.

The above description of the physical structure of the control system illustrated in the drawings will now be amplified by again describing it with regard to its operation, although this of necessity involves some repetition. Before beginning this description of its operation, it should be noted that the system has been illustrated in its deenergized condition.

When the "filament on" push button switch 180 is depressed it completes the energizing circuit for the operating winding 181 of relay 57 from one terminal of the secondary 52 of control circuit transformer 53 through conductor 59, the contacts of push button switch 180, the normally closed contacts of the "filament off" push button switch 182, and conductors 183, 50 and 51 to the other terminal of the secondary 52 of transformer 53. When this relay 57 picks up it closes its contacts 184 completing a holding circuit around the contacts of push button switch 180 which thereafter may be released. Pickup of this relay also completes a circuit through its contacts 185 which connects the primary 189 of filament transformer 186 across the terminals of the secondary 52 of control circuit transformer 53 through a resistor 187. This circuit extends from one terminal of the secondary 52 of transformer 53 through conductor 59, contacts 185 of relay 57, resistor 187, conductor 188, the primary 189 of transformer 186, and conductor 51 to the other terminal of secondary 52 of transformer 53. This applies half voltage to the filaments of the electric discharge devices in the power rectifier 4 which are connected to the output terminals of the secondary 90 of filament transformer 186.

Pickup of relay 57 also closes its contacts 56 which connect the primary 39 of transformer 37 across the secondary 52 of control circuit transformer 53. This circuit is completed from one terminal of the secondary 52 of this transformer through conductors 59 and 58, contacts 56 of relay 57, conductor 55, the secondary 39 of transformer 37, and conductors 50 and 51 to the other terminal of the secondary 52 of transformer 53. This energization of transformer 37 applies filament heating current to the filaments of the electric discharge devices 28—36 and rectifiers 146 and 160 by energizing a secondary of transformer 37 which as previously described has not been shown in the drawing in order to simplify it. Pickup of relay 57 also completes the energizing circuit of another filament transformer which supplies heating current to the filaments of electric discharge devices 15 and 16. Also, as previously explained, this circuit has not been illustrated in the drawing in order to simplify it.

Pickup of relay 57 also closes its contacts 194 to energize the operating winding 195 of relay 196. This circuit is completed from one terminal of the secondary 52 of the control circuit transformer 53 through conductor 59, contacts 194 of relay 57, the operating winding 195 of relay 196, and conductors 50 and 51 to the other terminal of the secondary 52 of transformer 53. Relay 196 has a time delay pickup as indicated and after a predetermined time delay closes its contacts 197 and 200. The closure of contacts 197 of relay 196 completes the energizing circuit for the operating winding 198 of relay 45. This circuit is completed from one terminal of the secondary 52 of control circuit transformer 53 through conductor 59, operating winding 198 of relay 45, contacts 197 of relay 96 and conductors 50 and 51 to the other terminal of the secondary 52 of control circuit transformer 53. This causes relay 45 to pick up.

Pickup of relay 45 closes its contacts 199 which shunt the resistor 187 and thereby apply full energization to the primary 189 of the filament transformer 186. Pickup of relay 45 also closes its contacts 44 and 48 which connect the end terminals of the secondary winding 38 of transformer 37 to supply conductors 41 and 42 through conductors 43 and 46 and conductors 47 and 49.

As a result of the energization of supply conductors 40, 41 and 42, capacitor 102 will be charged through the two branches of its full-wave rectifier comprising resistances 109 and rectifier elements 108. Also the capacitor 159 will be charged through its rectifier 160. The voltage divider 155, 156, 157 and 158 will thus become effective, and due to the positive potential of point 150'' in this divider, a turn-on voltage will be applied to the control element 19 of electric discharge device 36. This electric discharge device will become conducting at the beginning of a positive half cycle of its anode voltage which restraint is imposed by the voltage applied to its control element 20 which is connected to the phase shift circuit 176, 177 which permits conduction of this valve only at the beginning of a positive half cycle of its anode voltage. Anode-cathode conduction of electric discharge device 36 will energize the operating winding 154' of relay 154 causing it to pick up and open its contacts 153 and 162 and close its contacts 163. The opening of contacts 153 of relay 154 opens the discharge circuit through resistor 152 across storage capacitor 147. The closing of contacts 163 of relay 154 shorts out the element 157 in the voltage divider chain thereby making more positive the control voltage applied to the control element 19 of electric discharge device 36. The opening of contacts 162 of relay 154 deenergizes the control circuit of the rapper 164 which would otherwise be connected across the secondary 52 of the control circuit transformer 53.

Energization of conductors 42 and 40 will also charge capacitor 144 in the timing circuit connected in the control element circuit for control elements 20 of electric discharge devices 32 and 33. This circuit is completed from conductor 42 through resistor 124, inductance 121, capacitor 144, resistor 142 and the rectifying circuit between control elements 20 and the cathodes of electric discharge devices 32 and 33 to conductor 40. This will apply a negative hold-off voltage to these control elements 20 of electric discharge devices 32 and 33 for a time interval dependent upon the adjustment of the adjustable resistor 143 connected across the capacitor 144 which will control the rate of discharge of this capacitor 144 beginning with the conductivity of electric discharge device 30.

Pickup of relay 196 also closed its contact 200 which completed the energizing circuit for the operating winding 201 of relay 202 from one terminal of the secondary 52 of control circuit transformer 53 through conductor 59, 50 and 51 to the other terminal of the secondary 52 of this transformer. Consequently, after a predetermined time delay relay 202 will pick up closing its contacts 203 which prepare a circuit for the energization of other relays resulting from the closure of "start" push button switch 204.

The closure of start push button switch 204 completes the energizing circuit for the operating winding 192 of relay 193 which extends from one terminal of the secondary 52 of control circuit transformer 53 through the contacts of start push button switch 204, the contacts 191 of relay 57 which have previously been closed by pickup of this relay, the contacts of a stop push button switch 205, the normally closed contacts 206 of relay 71 and conductors 50 and 51 to the other terminal of the secondary 52 of this transformer. Pickup of relay 193 closes its contacts 207 which are shunted across the contacts of the start push button 204 which may thereafter be released without deenergizing relay 193. Pickup of relay 193 also causes its contacts 208 to complete the energizing circuit for the operating winding 209 of relay 135 from one terminal of the secondary 52 of control circuit transformer 53 through the previously closed contacts 203 of relay 202, the contacts 208 of relay 193, the normally closed contacts 210 of relay 65, and conductors 50 and 51 to the other terminal of the secondary 52 of this transformer. This causes relay 135 to pick up.

Pickup of relay 135 closes its contacts 134 thereby completing the anode-cathode circuit of electric discharge device 35 through the operating winding 137 of relay 68. This circuit extends from conductor 42 through conductor 72, 136, 133, 66, winding 137 of relay 68 and the anode-cathode circuit of electric discharge device 35 to conductor 40. At this time the control element 19 of this electric discharge device is at cathode potential since control transformers 75 and 126 are deenergized. Consequently electric discharge device 35 will conduct at the beginning of a positive half cycle of its anode voltage as determined by the control element voltage applied to its control element 20 through the phase shift circuit 79 and 80. Relay 68 will consequently pick up closing its contacts 67.

The pickup of relay 135 also closes its contacts 211 to complete the energizing circuit of operating winding 212 of line contactor 9. This circuit is completed from one terminal of the secondary 52 of control circuit transformer 53 through conductor 59, contacts 203 of relay 202, contacts 208 of relay 193, conductor 213, contacts 211 of relay 135, the operating winding 212 of contactor 9 and conductor 51 to the other terminal of the secondary 52 of transformer 53. This causes the contactor 9 to close its contacts. The closure of contacts 11 of contactor 9 completes the connection of the primary of the power transformer 7 with supply conductors 8 through the controllable impedance 10. The closure of its contacts 214 completes its holding circuit around contacts 211 of relay 135 and the closure of its contacts 215 completes the energizing circuit for the operating winding 216 of relay 65 from one terminal of the secondary 52 of the control circuit transformer 53 through conductors 59, 50 and 51 to the other terminal of this secondary of transformer 53. This will cause relay 65 to pick up.

Pickup of relay 65 causes it to open its contacts 210 thereby deenergizing the operating winding 209 of relay 135 which will drop out opening its contacts. The opening of contacts 211 of relay 135 has no effect on the contactor 9 whose circuit is now completed through its holding contacts 214. The opening of contacts 134 of relay 135 does not deenergize relay 68 since upon pickup of this relay its holding circuit is completed through its own contacts 67, conductor 69, contacts 70 of relay 71 and conductor 72 to the supply conductor 42.

Pickup of relay 65 also closes its contact 64 thereby completing the anode-cathode circuits of electric discharge devices 28 and 34 from conductor 42 through conductor 72, contacts 70 and relay 71, conductor 69, contacts 67 of relay 68, conductor 66, contacts 64 of relay 65, conductor 63, the primary winding 61 of control transformer 62 and conductors 60 and 61 to the anodes of these electric discharge devices whose cathodes are directly connected to conductor 40. Electric discharge device 28 is not free to conduct since its conduction is dependent on the prior conduction, during the immediately preceding half cycle, of electric discharge device 29 whose anode-cathode drop must be applied to control element 20 of electric discharge device 28 at the same time that the anode-cathode drop of electric discharge device 31 is applied to control element 19 of electric discharge device 28. Electric discharge device 34, however, is free to conduct at the beginning of a positive half cycle of its anode voltage as determined by the phase shift voltage from phase shift circuit 79, 80 which is applied to its control element 20. This result follows since its control element 19 is at cathode potential since its timing circuit capacitor 82 is not charged and the control transformers 75 and 87 are deenergized.

Conduction of electric discharge device 34 consequently energizes the primary 61 of control transformer 62 whose secondary 100 will thus produce a voltage drop across resistor 101 which is in the control element circuit of electric discharge device 15. This voltage drop across resistor 101 will overcome the negative bias voltage of capacitor 102 and thus cause electric discharge device 15 to conduct and short the secondary 14 of the series controlling transformer 12. This will reduce to practically zero the impedance of the primary winding of this series controlling transformer and effectively connect the primary of the power transformer 7 to the supply conductors 8 which will result in energization of the power rectifier and the supply of a rectified half-cycle of current flow to the precipitator 3.

This first rectified half-cycle surge of current supplied to the precipitator 3 will produce a voltage in the potentiometer 6 which is connected in the load circuit and this voltage will overcome the negative bias of potentiometer 110 and apply a turn-on voltage to the control element 19 of electric discharge device 30. This will render this electric discharge device conducting and release electric discharge device 31 for conduction during the next half cycle provided a turn-on voltage is applied to the control element 19 of this electric discharge device 31. Electric discharge device 31 conducts in trailing response to conduction of electric discharge device 30 because of the drop from anode to cathode of electric discharge device 30 carries over into the next half cycle due to the inductive nature of its anode-cathode circuit resulting from inductance 121.

Conduction of electric discharge device 34 also results in conduction of electric discharge device 29 in trailing response thereto as a result of its anode-cathode drop carrying over into into the next half cycle when the anode voltage of electric discharge device 29 is positive. This anode-cathode voltage drop of electric discharge device 34 is applied through conductors 61 and 60, negative self-biasing circuit 94 and resistor 93 to control element 19 of electric discharge device 29. The other control element 20 of electric discharge device 29 is tied to its cathode so that electric discharge device 29 conducts in trailing response to conduction of electric discharge device 34.

Conduction of electric discharge device 29 energizes the primary 74 of control transformer 75 whose secondary 104 produces a voltage drop across resistor 105 which overcomes the bias of capacitor 102 and renders electric discharge device 15 conductive. The voltage reversal in winding 106 of transformer 62 resulting from the deenergization of primary 61 also assists. Conduction of electric discharge device 16 short circuits the secondary 14 of the series controlling transformer 12 during the next half cycle and thereby reduces the impedance of its primary winding 13 so that the power transformer 7 is energized during the next half cycle of the voltage of the supply conductors 18. This causes a consecutive half cycle surge of current to flow through the rectifier to the precipitator 3.

This second consecutive surge of current supplied to the precipitator 3 produces a voltage in the potentiometer 6 connected in the load circuit of the precipitator which voltage overcomes the bias voltage from potentiometer 110 and applies a positive turn-on voltage to the control element 19 of the electric discharge device 31 which has already been freed for conduction by the prior conduction of electric discharge device 30 applying a turn-on voltage to the control element 20 of electric discharge device 31. By providing the phase shift circuit 123, 124 and connecting the anode of electric discharge device 30 through inductance 121 to the common terminal 122 of resistor 124 and 123, conduction of electric discharge device 30 is made to continue over to and preferably slightly beyond the 90 degree point of its next half cycle of voltage when the anode voltage of electric discharge device 31 is positive. This insures response of the electric discharge device 31 to the peak value of the current surge flowing in the load circuit of the precipitator.

When both electric discharge devices 31 and 29 conduct at the same time, the negative hold-off voltage of secondary 89 of control transformer 75 is opposed by the positive turn-on voltage of the secondary 128 of control transformer 126 so that conductivity of electric discharge device 35 is maintained and relay 68 continues to be energized, completing its circuit through its contacts 67. If, however, either electric discharge device 30 or 31 fails to conduct, the voltage of the secondary 89 of control transformer 75 will render electric discharge device 35 nonconducting and thus shut the system down. This result follows if there is a skip in the half cycle rectified current supplied by the power rectifier 4. If this skip occurred during the first half cycle of operation of the rectifier, the electric discharge device 30 would fail to operate thereby preventing electric discharge device 31 from operating in trailing response even though a turn-on voltage were applied to its control element 19 as a result of the rectifier operating during the next half cycle. Of course, if the rectifier failed to operate during this next half cycle, the electric discharge device 31 would not become conducting, even though prior conduction of electric discharge device 30 released it for conduction.

Conduction of electric discharge device 29 energizes the secondary 89 of the control transformer 75 and this charges the capacitor 82 located in the control element circuit of the control element 19 of electric discharge device 34. This applies a negative hold-off voltage to this control element and prevents electric discharge device 34 from again conducting until after a predetermined time after 29 becomes nonconducting. Although conduction of electric discharge device 34 is thus blocked out, conduction of electric discharge device 28 follows in trailing response the conduction of electric discharge device 29, provided, of course, that the anode-cathode drop of electric discharge device 29 is applied to control element 20 of electric discharge device 28 and the anode-cathode drop of electric discharge device 31 is applied to the control element 19 of electric discharge device 28, so that the carryover of current flow in the inductive circuits of electric discharge devices 29 and 31 simultaneously apply to the control elements 19 and 20 of electric discharge device 28 turn-on voltages which are effective when the anode of electric discharge device 28 is positive.

If an overload occurs in the load circuit of the precipitator the voltage drop across potentiometer 6 connected therein becomes sufficient to overcome the negative bias of potentiometer 140 and render the electric discharge devices 32 and 33 conducting. This result cannot occur, however, each time initiation of conduction of the precipitator occurs when the charging current may be greater than the overload current because of the time delay imposed by capacitor 144 connected in the control element circuits of the control elements 20 of electric discharge devices 32 and 33. As was stated above, this capacitor 144 applies a negative hold-off voltage for predetermined time interval beginning with each starting of the supply of current to the precipitator. After this time interval has elapsed, however, the anode-cathode drop of electric discharge device 30 applies a turn-on voltage to the control elements 20 of electric discharge devices 32 and 33 so that their conduction is solely dependent on the control voltage applied to their control elements 19.

If for some reason overload current flows in the load circuit as may result from arcing in the precipitator, the magnitude of current flow through the potentiometer 6 will produce a voltage drop therein sufficient to overcome the negative bias of potentiometer 140 and therefore cause electric discharge devices 32 and 33 to conduct as a result of the control voltage applied to their control elements 19. It is, of course, assumed that this overload is not due to the charging current supplied to the precipitator and its circuits and that consequently sufficient time has elapsed since the precipitator was set in operation so that the time delay of capacitor 144 is no longer effective and conduction of electric discharge device 30 has applied a control voltage to the control elements 20 of electric discharge devices 32 and 33 which released them for conduction.

Conduction of electric discharge devices 32 and 33 connect the primary winding 91 of control transformer 87 across the supply conductors 40 and 41. This induces a voltage in the secondary 99 of transformer 87 which applies a hold-off voltage in the control element circuit of control element 19 of electric discharge device 28 which overcomes the anode-cathode voltage drop across the electric discharge device 31 and therefore, prevents electric discharge device 28 from conducting. This will prevent conduction of electric discharge devices 15 and 16 and result in the series transformer 12 interposing a high impedance between the supply conductors 8 and the primary of the power transformer 7, thus effectively limiting the work current to a very low value or zero.

Conduction of electric discharge devices 32 and 33 in response to an overload will also induce in the secondary 86 of control transformer 87 a voltage which will charge capacitor 82 in the control element circuit of electric discharge device so as to insure the proper time delay before each restarting of the system. This will occur irrespective of the operation of electric discharge device 29 also acting on the timing capacitor 82 in the same manner through secondary 89 of control transformer 75. A voltage will also be induced in the secondary 145 of transformer 87 which will produce a charging voltage for the storage capacitor 147 to which the rectified current is supplied from winding 145 through rectifier 146.

If the frequency at which overloads occur is greater than a predetermined rate, the voltage of storage capacitor 147 will increase and exist for a sufficient length of time to charge the control capacitor 150 so that it presents a negative control voltage to the control element 19 of electric discharge device 36. This will cause this electric discharge device 36 to become nonconducting and deenergize the operating winding 154' of relay 154. When this relay drops it will close its contacts 153 completing the discharge circuit across storage capacitor 147. It will also complete a circuit through its contact 163 which will short out resistor 157 in the voltage divider resistor chain so as to increase the negative voltage applied to the control element 19 of the electric discharge device 36, and thereby insure its nonconductivity and positive operation of relay 154.

The drop out of relay 154 also closes its contact 162 which completes the operating circuit for the rapper 164. This circuit extends from one terminal of the secondary 52 of the control circuit transformer 53 through conductor 165, contact 162 of relay 154, conductor 166, contact 167 of relay 168 and conductors 169, 170 and 51 to the other terminal of the secondary 52 of transformer 53. The completion of this circuit will operate the rapper to vibrate the collecting electrode 2 of the precipitator 3 to dislodge therefrom any deposits that caused the arcing which led to overload conditions in the load circuit. At the same time that the rapper is energized the operating winding 171 of relay 168 is also energized from one terminal of the secondary 52 of control circuit transformer 53 through conductor 165, contacts 162 of relay 154, conductor 166 and 225, contacts 172 of a push button switch, operating winding 171 of relay 168 and conductors 50 and 51 to the other terminal of the secondary 52 of transformer 53. After a predetermined time delay, relay 168 will open its contacts 167, deenergizing the rapper and closing its contacts 217 to complete the energizing circuit of the operating winding 218 of relay 219. The energizing circuit for this relay is believed to be quite obvious in view of the previous description.

When relay 219 picks up after a predetermined time delay it closes its contacts 220 to complete the energizing circuit for the operating winding 221 of relay 71. This energizing circuit extends from one terminal of the secondary 52 of the control circuit transformer 53 through conductor 59, the contacts of reset switch 223, contacts 220 of relay 219, the operating winding 221 of relay 71, and conductors 50 and 51 to the other terminal of secondary 52 of transformer 53.

Pickup of relay 71 will close its contact 222 completing its holding circuit about contacts 220 of relay 219. It will also open its contacts 70 and drop out relay 68 whose energizing winding 137 is in series circuit with contacts 70 across supply conductors 40 and 42. Relay 71 will also open its contact 206 thereby dropping out relay 193 the opening of whose contacts 208 will deenergize the operating winding 212 of the contactor 9. This contactor will consequently open its contact 11 to disconnect the supply conductors from the power transformer 7. After this has occurred the circuit may again be set in operation by opening the reset switch 223 and thereafter closing the start push button 204.

The circuit has been simplified by omitting therefrom certain signal lights and the operating circuits for these signal lights. Such signals are provided in order to warn the operator of failure in any respect in the system and the nature of this failure. The nature of the rapper and its control has not been illustrated and described since all that it is necessary to know about it is that it is set in operation under certain circumstances and when in operation acts to vibrate the collecting electrode of the precipitator to dislodge deposits therefrom.

It will be noted that the arrangement in the system is such that failure of any of the electric discharge devices results in shutdown of the system except for electric discharge devices 32 and 33 which have been paralleled so that failure of either one of these devices alone will not disrupt the desired operation of the system. It is quite unlikely that both these electric discharge devices 32 and 33 will fail at the same time.

The system above described may be variously modified without departing from the spirit and scope of my invention. Thus, the controllable impedance 10 may be replaced by another circuit controlling means which is actuated by the electric discharge devices 28 and 29. For example, these discharge devices may be employed as the circuit controlling means in the power circuit or employed for controlling a pair of reversely connected electric discharge devices inserted directly in this circuit. It is also apparent that the several leading and trailing operations of the electric discharge devices above described may be accomplished in another manner than by using the voltage drop from anode to cathode of one electric discharge device carrying over into the next half cycle due to the inductive circuit in which the device is placed so as to control the conduction of another electric discharge device when its anode voltage is positive during such next half cycle. It is also, of course, apparent that the refinement resulting from providing control transformers 62 and 75 with pairs of windings for introducing control voltages in the control element circuits of the electric discharge devices 15 and 16 is not necessary since a single secondary winding will be effective in providing an operative system.

In systems built embodying my invention the voltage of the supply conductors has been 440 volts and the output voltage of the power transformer has been 50,000 volts. It is, of course, apparent that other supply voltages and output voltages may be used without departing from my invention. Furthermore, in order to simplify the presentation of the precipitator the most simple form thereof has been illustrated. It will be apparent, however, that any type of precipitator may be used and it is to be understood that precipitators having a plurality of discharge electrodes and a plurality of collecting electrodes may be employed. These collecting electrodes may be in the form of plates between which the discharge electrodes are arranged.

It is also apparent that my invention is not limited in its application to electrostatic precipitators. It may be used with any type of translating device where protection is to be provided due to overcurrent, undercurrent, or where the frequency of faults due to overcurrents are greater than a predetermined rate. Furthermore, one or more of the means responsive to overcurrent, undercurrent or frequency of overcurrent may be omitted without departing from my invention when it is applied to certain types of translating apparatus.

Thus, while I have shown and described but one particular embodiment of my invention, and suggested certain modifications therein, it will be quite obvious to those skilled in the art that many other changes and modifications may be made without departing from my invention in its broader aspects, and I therefore aim in the appended claims to cover all such changes and modifications as fall within the true spirit and scope of my invention.

What I claim as new and desire to secure by Letters Patent of the United States is:

1. A rectifier system comprising a full wave rectifier having input and output terminals, load conductors connected to said output terminals of said rectifier, alternating current supply conductors, a circuit-controlling means connected between said supply conductors and the input terminals of said rectifier for controlling the supply of alternating current to said rectifier, and means including leading and trailing electric discharge devices each having an anode and a cathode reversely connected with said supply conductors and each having a control element connected with said load conductors and responsive to a skip in the half cycle rectified pulses of current flow in said load conductors for operating said circuit-controlling means after not more than a half cycle of the alternating current supply following said skip to prevent flow of work current through said rectifier.

2. A rectifier system comprising a full wave rectifier having input and output terminals, load conductors connected to said output terminals of said rectifier, alternating current supply conductors, a circuit-controlling means connected between said supply conductors and the input terminals of said rectifier for controlling the supply of alternating current to said rectifier, means connected with said load conductors and responsive to a skip in the half cycle rectified pulses of current flow in said load conductors for operating said circuit-controlling means to prevent flow of work current through said rectifier, and means for operating said circuit-controlling means to re-establish the flow of work current through said rectifier after a predetermined time delay initiated by the operation of said last-mentioned means.

3. A rectifier system comprising a full wave rectifier having input and output terminals, load conductors connected to said output terminals of said rectifier, alternating current supply conductors, a circuit-controlling means connected between said supply conductors and the input terminals of said rectifier, said circuit controlling means operating promptly to absorb and promptly to re-establish substantially the full voltage of said supply conductors applied thereby to the input terminals of said rectifier and thus promptly prevent and promptly re-establish the flow of work current through said rectifier, means connected with said load conductors and responsive to overload current flow in said load conductors for operating said circuit-controlling means to prevent promptly the flow of work current through said rectifier, and means for operating said circuit-controlling means after a predetermined time delay initiated by the operation of said last-mentioned means to re-establish promptly at substantially the full voltage of said supply conductors the flow of work current through said rectifier.

4. A rectifier system comprising a full wave rectifier having input and output terminals, load conductors connected to said output terminals of said rectifier, alternating current supply conductors, a circuit-controlling means connected between said supply conductors and the input terminals of said rectifier, said circuit controlling means operating promptly to absorb and promptly to re-establish substantially the full voltage of said supply conductors applied thereby to the input terminals of said rectifier and thus promptly prevent and promptly re-establish the flow of work current through said rectifier, means connected with said load conductors and responsive to a skip in the half cycle rectified pulses of current flow in said load conductors for operating said circuit-controlling means to prevent promptly the flow of work current through said rectifier, means connected with said load conductors and responsive to overload current flow in said load conductors for operating said circuit-controlling means to prevent promptly the flow of work current through said rectifier, and means for operating said circuit-controlling means after a predetermined time delay initiated by the operation of either of said last two mentioned means to re-establish promptly at substantially the full voltage of said supply conductors the flow of work current through said rectifier.

5. A rectifier system comprising a full wave rectifier having input and output terminals, load conductors connected to said output terminals of said rectifier, alternating current supply conductors, a circuit-controlling means connected between said supply conductors and the input terminals of said rectifier, said circuit controlling means operating promptly to absorb and promptly to re-establish substantially the full voltage of said supply conductors applied thereby to the input terminals of said rectifier and thus promptly prevent and promptly re-establish the flow of work current through said rectifier, means connected with said load conductors and responsive to a skip in the half cycle rectified pulses of current flow in said load conductors for operating said circuit-controlling means to prevent promptly the flow of work current through said rectifier, means connected with said load conductors and responsive to overload current flow in said load conductors for operating said circuit-controlling means to prevent promptly the flow of work current through said rectifier, means for operating said circuit-controlling means after a predetermined time delay initiated by the operation of either of said last two mentioned means to re-establish promptly at substantially the full voltage of said supply conductors the flow of work current through said rectifier, and means connected with said load conductors and responsive to overload current faults of a frequency greater than a preestablished rate for interrupting the connection between said supply conductors and the input terminals of said rectifier.

6. A rectifier system comprising a full wave rectifier having input and output terminals, load conductors connected to said output terminals of said rectifier, alternating current supply conductors, a circuit-controlling means connected between said supply conductors and the input terminals of said rectifier, said circuit controlling means operating promptly to absorb and promptly to re-establish substantially the full voltage of said supply conductors applied thereby to the input terminals of said rectifier and thus promptly prevent and promptly re-establish the flow of work current through said rectifier, a relay system for controlling the connection of said supply conductors with the input terminals of said rectifier through said circuit controlling means and for rendering said circuit controlling means operative, means connected with said load conductors and responsive to a skip in the half cycle rectified pulses of current flow in said load conductors for operating said circuit-controlling means to prevent promptly the flow of work current through said rectifier, means connected with said load conductors and responsive to overload current flow in said load conductors for operating said circuit-controlling means to prevent promptly the flow of work current through said rectifier, means for operating said circuit-controlling means after a predetermined time delay initiated by the operation of either of said last two mentioned means to re-establish promptly at substantially the full voltage of said supply conductors the flow of work current through said rectifier, means also responsive to a skip in the half cycle rectified pulses of current flow in said load conductors for rendering said circuit controlling means inoperative until again rendered operative by operation of said relay system to interrupt and thereafter re-establish the connection between said supply conductors and the input terminals of said rectifier, and means connected with said load conductors and responsive to overload current faults of a frequency greater than a preestablished rate for operating said relay system to interrupt the connection between said supply conductors and the input terminals of said rectifier.

7. Apparatus comprising alternating current supply conductors, load conductors, a full wave rectifier having input and output terminals, means connecting said load conductors with said output terminals of said rectifier, and means for controlling the flow of current from said supply conductors to said input terminals of said rectifier, said means including a pair of electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, means connecting the anode-cathode circuits of said electric discharge devices with said supply conductors so that said one of said electric discharge devices may conduct during half cycles of voltage of one polarity and the other of said electric discharge devices may conduct during immediately following half cycles of the opposite polarity, means responsive to anode-cathode conduction of said one of said electric discharge devices which was initiated during a half cycle of supply circuit voltage when its anode voltage was positive for introducing into said control element circuit of said other of said electric discharge devices a voltage which will initiate conduction of said other electric discharge device during the next half cycle of said supply conductor voltage when its anode voltage is positive, and means for introducing into each of said control element circuits of said one of said electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said electric discharge devices which was initiated during an immediately preceding half cycle of supply conductor voltage when its anode voltage was positive and the supply of the other of said voltages in the other of said control element circuits being dependent on the flow of consecutive half cycle pulses of rectified current in said load conductors.

8. Apparatus comprising alternating current supply conductors, load conductors, a full wave rectifier having input and output terminals, means connecting said load conductors with said output terminals of said rectifier, and means for controlling the flow of current from supply conductors to said input terminals of said rectifier, said means including a current initiating electric discharge device having an anode, a cathode, a control element and a control element circuit which connects its said control element with its said cathode, a pair of electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, means connecting the anode-cathode circuits of said electric discharge devices with said supply conductors so that said current initiating electric discharge device and said one of said pair of electric discharge devices may conduct during half cycles of voltage of one polarity and the other of said pair of electric discharge devices may conduct during immediately following half cycles of the opposite polarity, means responsive to anode-cathode conduction of either one of said current initiating electric discharge device and said one of said pair of electric discharge devices which was initiated during a half cycle of supply circuit voltage when its anode voltage was positive for introducing into said control element circuit of said other of said pair of electric discharge devices a voltage which will initiate conduction of said other electric discharge device during the next half cycle of said supply conductor voltage when its anode voltage is positive, means for introducing into each of said control element circuits of said one of said pair of electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said electric discharge devices which was initiated during an immediately preceding half cycle of supply conductor voltage when its anode voltage was positive and the supply of the other of said voltages in the other of said control element circuits being dependent on the flow of consecutive half cycle pulses of rectified current in said load conductors, a timing capacitor and its parallel connected resistor connected in the control element circuit of said current initiating electric discharge device, means responsive to anode-cathode conduction of said other of said pair of electric discharge devices for charging said capacitor through the control element to cathode circuit of said current initiating electric discharge device to apply a negative hold off voltage in said circuit for a predetermined time interval after anode-cathode conduction of said other of said electric discharge device stops, and means for controlling the anode-cathode connection of said current initiating electric discharge device and said one of said pair of electric discharge devices with said supply conductors.

9. Apparatus comprising alternating current supply conductors, load conductors, a full wave rectifier having input and output terminals, means connecting said load conductors with said output terminals of said rectifier, and means for controlling the flow of current from said supply conductors to said input terminals of said rectifier, said means including a first pair of electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, a second pair of electric discharge devices one of which has an anode, a cathode, a control element and a control element circuit which connects its said control element with its said cathode and the other of which has an anode, a cathode, two control elements, and two control element circuits each of which connects a different one of its said control elements with its said cathode, means connecting the anode-cathode circuits of said pairs of electric discharge devices with said supply conductors so that said ones of said pairs of said electric discharge devices may conduct during half cycles of voltage of one polarity and the others of said pairs of said electric discharge devices may conduct during immediately following half cycles of the opposite polarity, means responsive to anode-cathode conduction of said one of said first pair of electric discharge devices which was initiated during a half cycle of supply conductor voltage when its anode voltage was positive for introducing into said control element circuit of said other of said first pair of electric discharge devices a voltage which will initiate conduction of said other of said first pair of electric discharge device during the next half cycle of said supply conductor voltage when its anode voltage is positive, means for introducing into each of said control element circuits of said one of said first pair of electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said first pair of electric discharge devices which was initiated during an immediately preceding half cycle of supply conductor voltage when its anode voltage was positive and the supply of the other of said voltages in the other of said control element circuits being dependent on anode-cathode conduction of said other of said second pair of electric discharge devices which was initiated during an immediately preceding half cycle of supply conductor voltage when its anode voltage was positive, means responsive to anode-cathode conduction of said one of said second pair of electric discharge devices which was initiated during a half cycle of supply conductor voltage when its anode voltage was positive for introducing into said one control element circuit of said other of said second pair of electric discharge devices a voltage which releases it for conduction subject to the control voltage of its said other control element, and means responsive to rectified half cycle pulses of current flow in said load conductors which are greater than a predetermined minimum value for introducing a control voltage in the control element circuit of said one of said second pair of electric discharge devices which renders it conducting and in the other of said pair of control element circuits of said other of said second pair of electric discharge devices which renders it conducting subject to its release for conduction by the above mentioned voltage applied in its said one control element circuit.

10. Apparatus comprising alternating current supply conductors, load conductors, a full wave rectifier having input and output terminals, means connecting said load conductors with said output terminals of said rectifier, and means for controlling the flow of current from said supply conductors to said input terminals of said rectifier, said means including a current initiating electric discharge device having an anode, a cathode, a control element and a control element circuit which connects its said control element with its said cathode, a pair of load current flow controlling electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, a pair of control electric discharge devices one of which has an anode, a cathode, a control element and a control element circuit which connects its said control element with its said cathode and the other of which has an anode, a cathode, two control elements, and two control element circuits each of which connects a different one of its said control elements with its said cathode, means connecting the anode-cathode circuits of said electric discharge devices with said supply conductors so that said current initiating electric discharge device and said ones of said pairs of said electric discharge devices may conduct during half cycles of voltage of one polarity and the others of said pairs of said electric discharge devices may conduct during immediately following half cycles of the opposite polarity, means responsive to anode-cathode conduction of either one of said current initiating electric discharge devices and said one of said pair of load current flow controlling electric discharge devices which was initiated during a half cycle of supply conductor voltage when its anode voltage was positive for introducing into said control element circuit of said other of said pair of load current flow controlling electric discharge devices a voltage which will initiate conduction thereof during the next half cycle of said supply conductor voltage when its anode voltage is positive, means for introducing into each of said control element circuits of said one of said pair of load current flow controlling electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said pair of load current flow controlling electric discharge devices which was initiated during an immediately preceding half cycle of supply conductor voltage when its anode voltage was positive and the supply of the other of said voltages in the other of said control element circuits being dependent on anode-cathode conduction of said other of said pair of control electric discharge devices which was initiated during an immediately preceding half cycle of supply conductor voltage when its anode voltage was positive, means responsive to anode-cathode conduction of said one of said pair of control electric discharge devices which was initiated during a half cycle of supply conductor voltage when its anode voltage was positive for introducing into said one control element circuit of said other of said pair of control electric discharge devices a voltage which releases it for conduction subject to the control voltage of its said other control element, means responsive to rectified half cycle pulses of current flow in said load conductors which are greater than a predetermined minimum value for introducing a control voltage in the control element circuit of said one of said pair of control electric discharge devices which renders it conducting and in the other of said pair of control element circuits of said other of said pair of control electric discharge devices which renders it conducting subject to its release for conduction by the voltage applied in its said one control element circuit, a timing capacitor and its parallel connected resistor connected in the control element circuits of said current initiating electric discharge device, means responsive to anode-cathode conduction of said other of said pair of load current flow controlling electric discharge devices for charging said capacitor through the control element to cathode circuit of said current initiating electric discharge device to apply a negative hold off voltage in said circuit for a predetermined time interval after anode-cathode conduction of said other of said pair of load current flow controlling electric discharge device stops, and means for controlling the anode-cathode connection of said current initiating electric discharge device and said one of said pair of load current flow controlling electric discharge devices with said supply conductors.

11. Apparatus comprising alternating current supply conductors, load conductors, a full wave rectifier having input and output terminals, means connecting said load conductors with said output terminals of said rectifier, and means for controlling the flow of current from said supply conductors to said input terminals of said rectifier, said means including a current initiating electric discharge device having an anode, a cathode, a control element and a control element circuit which connects its said control element with its said cathode, a pair of load current flow controlling electric discharged devices one of which has an anode, a cathode, two control elements and two control element circuits each of which connects a different one of its said control elements with its said cathode and the other of which has an anode, a cathode, a control element and a control element circuit which connects its said control element with its said cathode, a pair of control electric discharge devices one of which has an anode, a cathode, a control element and a control element circuit which connects its said control element with its said cathode and the other of which has an anode, a cathode, two control elements, and two control element circuits each of which connects a different one of its said control elements with its said cathode, a shut down electric discharge device having an anode, a cathode, a control element and a control element circuit which connects its said control element with its said cathode, means connecting the anode-cathode circuits of said electric discharge devices with said supply conductors so that said current initiating electric discharge device, said ones of said pairs of said electric discharge devices, and said shut down electric discharge device may conduct half cycles of voltage of one polarity and the others of said pairs of said electric discharge devices may conduct during immediately following half cycles of the opposite polarity, means responsive to anode-cathode conduction of either one of said current initiating electric discharge devices and said one of said pair of load current flow controlling electric discharge devices which was initiated during a half cycle of supply conductor voltage when its anode voltage was positive for introducing into said control element circuit of said other of said pair of load current flow controlling electric discharge devices a voltage which will initiate conduction thereof during the next half cycle of said supply conductor voltage when its anode voltage is positive, means for introducing into each of said control element circuits of said one of said pair of load current flow controlling electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said pair of load current flow controlling electric discharge devices which was initiated during an immediately preceding half cycle of supply conductor voltage when its anode voltage was positive and the supply of the other of said voltages in the other of said control element circuits being dependent on anode-cathode conduction of said other of said pair of control electric discharge devices which was initiated during an immediately preceding half cycle of supply conductor voltage when its anode voltage was positive, means responsive to anode-cathode conduction of said one of said pair of control electric discharge devices which was initiated during a half cycle of supply conductor voltage when its anode voltage was positive for introducing into said one control element circuit of said other of said pair of control electric discharge devices a voltage which releases it for conduction during the next half cycle when its anode voltage is positive subject to the control voltage of its said other control element, means responsive to rectified half cycle pulses of current flow in said load conductors which are greater than a predetermined minimum value for introducing a control voltage in the control element circuit of said one of said pair of control electric discharge devices which renders it conducting and in the other of said pair of control element circuits of said other of said pair of control electric discharge devices which renders it conducting subject to its release for conduction by the voltage applied in its said one control element circuit, a timing capacitor and its parallel connected resistor connected in the control element circuit of said current initiating electric discharge device, means responsive to anode-cathode conduction of said other of said pair of load current flow controlling electric discharge devices for charging said capacitor through the control element to cathode circuit of said current initiating electric discharge device to apply a negative hold off voltage in said circuit for a predetermined time interval after anode-cathode conduction of said other of said pair of load current flow controlling electric discharge devices, and means responsive to a change in the state of conductivity of said shut down electric discharge device for disconnecting the anode-cathode circuits of said current initiating electric discharge device and said one of said pair of load current flow controlling electric discharge devices.

12. Apparatus comprising alternating current supply conductors, load conductors, a full wave rectifier having input and output terminals, means connecting said load conductors with said output terminals of said rectifier, and means for controlling the flow of current from said supply conductors to said input terminals of said rectifier, said means including a current initiating electric discharge device having an anode, a cathode, a control element and a control element circuit which connects its said control element with its said cathode, a pair of load current flow controlling electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, a pair of control electric discharge devices one of which has an anode, a cathode, a control element and a control element circuit which connects its said control element with its said cathode and the other of which has an anode, a cathode, two control elements, and two control element circuits each of which connects a different one of its said control elements with its said cathode, an overload responsive electric discharge device having an anode, a cathode, two control elements and two control element circuits each of which connects a different one of its said control elements with its said cathode, means connecting the anode-cathode circuits of said electric discharge devices with said supply conductors so that said current initiating electric discharge device, and said ones of said pairs of said electric discharge devices may conduct during half cycles of voltage of one polarity and the others of said pairs of said electric discharge devices and said overload responsive electric discharge device may conduct during immediately following half cycles of the opposite polarity, means responsive to anode-cathode conduction of either one of said current initiating electric discharge devices and said one of said pair of load current flow controlling electric discharge devices which was initiated during a half cycle of supply conductor voltage when its anode voltage was positive for introducing into said control element circuit of said other of said pair of load current flow controlling electric discharge devices a voltage which will initiate conduction thereof during the next half cycle of said supply conductor voltage when its anode voltage is positive, means for introducing into each of said control element circuits of said one of said pair of load current flow controlling electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said pair of load current flow controlling electric discharge devices which was initiated during an immediately preceding half cycle of supply conductor voltage when its anode voltage was positive and the supply of the other of said voltages in the other of said control element circuits being dependent on anode-cathode conduction of said other of said pair of control electric discharge devices which was initiated during an immediately preceding half cycle of supply conductor voltage when its anode voltage was positive, means responsive to anode-cathode conduction of said one of said pair of control electric discharge devices which was initiated during a half cycle of supply conductor voltage when its anode voltage was positive for introducing into said one control element circuit of said other of said pair of control electric discharge devices a voltage which releases it for conduction subject to the control voltage of its said other control element, means responsive to rectified half cycle pulses of current flow in said load conductors which are greater than a predetermined minimum value for introducing a control voltage in the control element circuit of said one of said pair of control electric discharge devices which renders it conducting and in the other of said pair of control element circuits of said other of said pair of control electric discharge devices which renders it conducting subject to its release for conduction by the voltage applied in its said one control element circuit, means responsive to rectified half cycle pulses of current flow in said load conductors which are greater than a predetermined maximum for introducing into one of said control element circuits of said overload responsive electric discharge device a voltage which renders it conducting subject to the restraint of its other control element circuit voltage, means responsive to anode-cathode conduction of said one of said pair of control electric discharge devices and initially effective after a predetermined time delay for applying a voltage in the other of said control element circuits which in conjunction with said voltage in its said one control element circuit renders said overload responsive electric discharge device conducting, means responsive to anode-cathode conduction of said overload responsive electric discharge device for applying a hold off voltage in said other of said control element circuits of said one of said pair of load current flow controlling electric discharge devices, a timing capacitor and its parallel connected resistor connected in the control element circuit of said current initiating electric discharge device, means responsive to anode-cathode conduction of said other of said pair of load current flow controlling electric discharge devices and of said overload responsive electric discharge device for charging said capacitor through the control element to cathode circuit of said current initiating electric discharge device to apply a negative hold off voltage in said circuit for a predetermined time interval after anode-cathode conduction of said pair of load current flow controlling electric discharge devices and of said overload responsive electric discharge device stops, and means for controlling the anode-cathode connection of said current initiating electric discharge device and said one of said pair of load current flow controlling electric discharge devices with said supply conductors.

13. Apparatus comprising alternating current supply conductors, load conductors, a full wave rectifier having input and output terminals, means connecting said load conductors with said output terminals of said rectifier, and means for controlling the flow of current from said supply conductors to said input terminals of said rectifier, said means including a current initiating electric discharge device having an anode, a cathode, a control element and a control element circuit which connects its said control element with its said cathode, a pair of load current flow controlling electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, a pair of control electric discharge devices one of which has an anode, a cathode, a control element and a control element circuit which connects its said control element with its said cathode and the other of which has an anode, a cathode, two control elements, and two control element circuits each of which connects a different one of its said control elements with its said cathode, an overload responsive electric discharge device having an anode, a cathode, two control elements and two control element circuits each of which connects a different one of its said control elements with its said cathode, a frequency of overload responsive electric discharge device having an anode, a cathode, a control element and a control element circuit which connects its said control element with its said cathode, a shut down electric discharge device having an anode, a cathode, a control element and a control element circuit which connects its said control element with its said cathode, means connecting the anode-cathode circuits of said electric discharge devices with said supply conductors so that said current initiating electric discharge device, said ones of said pairs of said electric discharge devices, and said shut down electric discharge device may conduct during half cycles of voltage of one polarity and the others of said pairs of said electric discharge devices, said overload responsive electric discharge device, and said frequency of overload responsive electric discharge device may conduct during immediately following half cycles of the opposite polarity, means responsive to anode-cathode conduction of either one of said current initiating electric discharge devices and said one of said pair of load current flow controlling electric discharge devices which was initiated during a half cycle of supply conductor voltage when its anode voltage was positive for introducing into said control element circuit of said other of said pair of load current flow controlling electric discharge devices a voltage which will initiate conduction thereof during the next half cycle of said supply conductor voltage when its anode voltage is positive, means for introducing into each of said control element circuits of said one of said pair of load current flow controlling electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said pair of load current flow controlling electric discharge devices which was initiated during an immediately preceding half cycle of supply conductor voltage when its anode voltage was positive and the supply of the other of said voltages in the other of said control element circuits being dependent on anode-cathode conduction of said other of said pair of control electric discharge devices which was initiated during an immediately preceding half cycle of supply conductor voltage when its anode voltage was positive, means responsive to anode-cathode conduction of said one of said pair of control electric discharge devices which was initiated during a half cycle of supply conductor voltage when its anode voltage was positive for introducing into said one control element circuit of said other of said pair of control electric discharge devices a voltage which releases it for conduction subject to the control voltage in its said other control element circuit, means responsive to rectified half cycle pulses of current flow in said load conductors which are greater than a predetermined minimum value for introducing a control voltage in the control element circuit of said one of said pair of control electric discharge devices which renders it conducting and in the other of said pair of control element circuits of said other of said pair of control electric discharge devices which renders it conducting subject to its release for conduction by the voltage applied in its said one control element circuit, means responsive to half cycle pulses of current flow in said load conductors which are greater than a predetermined maximum for introducing into one of said control element circuits of said overload responsive electric discharge device a voltage which renders it conducting subject to the restraint of its other control element circuit voltage, means responsive to anode-cathode conduction of said one of said pair of control electric discharge devices and initially effective after a predetermined time delay for applying in the other of said control element circuits of said overload responsive electric discharge device a voltage which in conjunction with said voltage in its said one control element circuit renders said overload responsive device conducting, means responsive to anode-cathode conduction of said overload responsive electric discharge device for applying a hold off voltage in said other of said control element circuits of said one of said pair of load current flow controlling electric discharge devices, a timing capacitor and its parallel connected resistor connected in the control element circuit of said current initiating electric discharge device, means responsive to anode-cathode conduction of said other of said pair of load current flow controlling electric discharge devices and of said overload responsive electric discharge device for charging said capacitor through the control element to cathode circuit of said current initiating electric discharge device to apply a negative hold off voltage in said circuit for a predetermined time interval after anode-cathode conduction of said other of said pair of load current flow controlling electric discharge devices and of said overload responsive electric discharge device stops, bias voltage means connected in said control element circuit of said frequency of overload responsive electric discharge device for applying a voltage which controls its anode-cathode conductively, a control voltage capacitor also connected in said control element circuit of said frequency of overload responsive electric discharge device, a storage capacitor, means including a rectifier for charging said capacitor in response to anode-cathode conduction of said overload responsive electric discharge device, an adjustable discharge circuit connected across said storage capacitor, a charging circuit for said control voltage capacitor also connected across said storage capacitor for charging it to a polarity which after a time delay reverses the voltage in said control element circuit of said frequency of overload responsive electric discharge device from that provided by said bias voltage means, means responsive to conduction and non-conduction of said frequency of overload responsive electric discharge device for altering said bias voltage to increase its value of that polarity which produced its conduction or non-conduction, means responsive to simultaneous conduction of said others of said pairs of electric discharge devices for introducing into said control element circuit of said shut down electric discharge device, voltages which maintain its state of conductivity, and means responsive to a change in the state of conductivity of said shut down electric discharge device for disconnecting the anode-cathode circuits of said current initiating electric discharge device and said one of said pair of load current flow controlling electric discharge devices.

14. Apparatus comprising alternating current supply conductors, load conductors, a full wave rectifier having input and output terminals, means connecting said load conductors with said output terminals of said rectifier, and means for controlling the flow of current from said supply conductors to said input terminals of said rectifier, said means including a current initiating electric discharge device having an anode, a cathode, a control element and a control element circuit which connects its said control element with its said cathode, a pair of load current flow controlling electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, an overload responsive electric discharge device having an anode, a cathode, a control element and a control element circuit which connects its said control element with its said cathode, a frequency of overload responsive electric discharge device having an anode, a cathode, a control element and a control element circuit which connects its said control element with its said cathode, means connecting the anode-cathode circuits of said electric discharge devices with said supply conductors so that said current initiating electric discharge device and said one of said pair of load current flow controlling electric discharge devices may conduct during half cycles of voltage of one polarity and the other of said pair of load current flow controlling electric discharge devices, said overload responsive electric discharge device, and said frequency of overload responsive electric discharge device may conduct during immediately following half cycles of the opposite polarity, means responsive to anode-cathode conduction of either one of said current initiating electric discharge devices and said one of said pair of load current flow controlling electric discharge devices which was initiated during a half cycle of supply conductor voltage when its anode voltage was positive for introducing into said control element circuit of said other of said pair of load current flow controlling electric discharge devices a voltage which will initiate conduction thereof during the next half cycle of said supply conductor voltage when its anode voltage is positive, means for introducing into each of said control element circuits of said one of said pair of load current flow controlling electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said pair of load current flow controlling electric discharge devices which was initiated during an immediately preceding half cycle of supply conductor voltage when its anode voltage was positive and the supply of the other of said voltages in the other of said control element circuits being dependent on the flow of consecutive half cycle pulses of rectified current flow in said load conductors, means responsive to half cycle pulses of current flow in said load conductors which are greater than a predetermined maximum for introducing into said control element circuit of said overload responsive electric discharge device a voltage which renders it conducting, means responsive to anode-cathode conduction of said overload responsive electric discharge device for applying a hold off voltage in said other of said control element circuits of said one of said pair of load current flow controlling electric discharge devices, a timing capacitor and its parallel connected resistor connected in the control element circuit of said current initiating electric discharge device, means responsive to anode-cathode conduction of said other of said pair of load current flow controlling electric discharge devices and of said overload responsive electric discharge device for charging said capacitor through the control element to cathode circuit of said current initiating electric discharge device to apply a negative hold off voltage in said circuit for a predetermined time interval after anode-cathode conduction of said other of said pair of load current flow controlling electric discharge devices and of said overload responsive electric discharge device stops, bias voltage means connected in said control element circuit of said frequency of overload responsive electric discharge device for applying a voltage which controls its anode-cathode conductively, a control voltage capacitor also connected in said control element circuit of said frequency of overload responsive electric discharge device, a storage capacitor, means including a rectifier for charging said storage capacitor in response to anode-cathode conduction of said overload responsive electric discharge device, an adjustable discharge circuit connected across said storage capacitor, a charging circuit for said control voltage capacitor also connected across said storage capacitor for charging it to a polarity which after a time delay reverses the voltage in said control element circuit of said frequency of overload responsive electric discharge device from that provided by said bias voltage means, means responsive to conduction and non-conduction of said frequency of overload responsive electric discharge device for altering said bias voltage to increase its value of that polarity which produced its conduction or non-conduction, and means for controlling the anode-cathode connection of said initiating electric discharge device and said one of said pair of load current flow controlling electric discharge devices with said supply conductors.

15. Apparatus comprising alternating current supply conductors, load conductors, a full wave rectifier having input and output terminals, means connecting said load conductors with said output terminals of said rectifier, and means for controlling the flow of current from said supply conductors to said input terminals of said rectifier, said means including a pair of load current flow controlling electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, an overload responsive electric discharge device having an anode, a cathode, a control element and a control element circuit which connects its said control elements with its said cathode, a frequency of overload responsive electric discharge device having an anode, a cathode, a control element and a control element circuit which connects its said control element with its said cathode, means connecting the anode-cathode circuits of said electric discharge devices with said supply conductors so that said one of said pair of load current flow controlling electric discharge devices may conduct during half cycles of voltage of one polarity and the other of said pair of load current flow controlling electric discharge devices, said overload responsive electric discharge device, and said frequency of overload responsive electric discharge device may conduct during immediately following half cycles of the opposite polarity, means responsive to anode-cathode conduction of said one of said pair of load current flow controlling electric discharge devices which was initiated during a half cycle of supply conductor voltage when its anode voltage was positive for introducing into said control element circuit of said other of said pair of load current flow controlling electric discharge devices a voltage which will initiate conduction thereof during the next half cycle of said supply conductor voltage when its anode voltage is positive, means for introducing into each of said control element circuits of said one of said pair of load current flow controlling electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said pair of load current flow controlling electric discharge devices which was initiated during an immediately preceding half cycle of supply conductor voltage when its anode voltage was positive and the supply of the other of said voltages in the other of said control element circuits being dependent on the flow of consecutive half cycle pulses of rectified current in said load conductors, means responsive to half cycle pulses of current flow in said load conductors which are greater than a predetermined maximum for introducing into said control element circuit of said overload responsive electric discharge device a voltage which renders its conducting, means responsive to anode-cathode conduction of said overload responsive electric discharge device for applying a hold off voltage in said other of said control element circuits of said one of said pair of load current flow controlling electric discharge devices, bias voltage means connected in said control element circuit of said frequency of overload responsive electric discharge device for applying a voltage which controls its anode-cathode conductivity, a control voltage capacitor also connected in said control element circuit of said frequency of overload responsive electric discharge device, a storage capacitor, means including a rectifier for charging said storage capacitor in response to anode-cathode conduction of said overload responsive electric discharge device, an adjustable discharge circuit connected across said storage capacitor, a charging circuit for said control voltage capacitor also connected across said storage capacitor for charging it to a polarity which after a time delay reverses the voltage in said control element circuit of said frequency of overload responsive electric discharge device from that provided by said bias voltage means, and means responsive to conduction and non-conduction of said frequency of overload responsive electric discharge device for altering said bias voltage to increase its value of that polarity which produced its conduction or non-conduction.

16. Apparatus comprising alternating current supply conductors, load conductors, a full wave rectifier having input and output terminals, means connecting said load conductors with said output terminals of said rectifier, and means for controlling the flow of current from said supply conductors to said input terminals of said rectifier, said means including a current initiating electric discharge device having an anode, a cathode, a control element and a control element circuit which connects its said control element with its said cathode, a pair of load current flow-controlling electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, an overload responsive electric discharge device having an anode, a cathode, a control element and a control element circuit which connects its said control elements with its said cathode, means connecting the anode-cathode circuits of said electric discharge devices with said supply conductors so that said current initiating electric discharge device and said one of said pair of load current flow-controlling electric discharge devices may conduct during half cycles of voltage of one polarity and the other of said pair of load current flow-controlling electric discharge devices and said overload responsive electric discharge device may conduct during immediately following half cycles of the opposite polarity, means responsive to anode-cathode conduction of said one of said pair of load current flow-controlling electric discharge devices which was initiated during a half cycle of supply conductor voltage when its anode voltage was positive for introducing into said control element circuit of said other of said pair of load current flow-controlling electric discharge devices a voltage which will initiate conduction thereof during the next half cycle of said supply conductor voltage when its anode voltage is positive, means for introducing into each of said control element circuits of said one of said pair of load current flow-controlling electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said pair of load current flow-controlling electric discharge devices which was initiated during an immediately preceding half cycle of supply conductor voltage when its anode voltage was positive and the supply of the other of said voltages in the other of said control element circuits being dependent on the flow of consecutive half cycle pulses of rectified current in said load conductors, means responsive to half cycle pulses of current flow in said load conductors which are greater than a predetermined maximum for introducing into said control element circuit of said overload responsive electric discharge device a voltage which renders it conducting, means responsive to anode-cathode conduction of said overload responsive electric discharge device for applying a hold off voltage in said other of said control element circuits of said one of said pair of load current flow-controlling electric discharge devices, a timing capacitor and its parallel connected resistor connected in the control element circuit of said current initiating electric discharge device, means responsive to anode-cathode conduction of said other of said pair of load current flow-controlling electric discharge devices and of said overload responsive electric discharge device for charging said capacitor through the control element to cathode circuit of said current initiating electric discharge device to apply a negative hold off voltage in said circuit for a predetermined time interval after anode-cathode conduction of said other of said pair of load current flow-controlling electric discharge devices and of said overload responsive electric discharge device stops, and means for controlling the anode-cathode connection of said initiating electric discharge device and said one of said pair of load current flow-controlling electric discharge devices with said supply conductors.

17. Apparatus comprising alternating current supply conductors, load conductors, a full wave rectifier having input and output terminals, means connecting said load conductors with said output terminals of said rectifier, and means for controlling the flow of current from said supply conductors to said input terminals of said rectifier, said means including a current initiating electric discharge device having an anode, a cathode, a control element and a control element circuit which connects its said control element with its said cathode, a pair of load current flow-controlling electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, an overload responsive electric discharge device having an anode, a cathode, a control element and a control element circuit which connects its said control elements with its said cathode, means connecting the anode-cathode circuits of said electric discharge devices with said supply conductors so that said current initiating electric discharge device and said one of said pair of load current flow-controlling electric discharge devices may conduct during half cycles of voltage of one polarity and the other of said pair of load current flow-controlling electric discharge devices and said overload responsive electric discharge device may conduct during immediately following half cycles of the opposite polarity, means responsive to anode-cathode conduction of said one of said pair of load current flow-controlling electric discharge devices which was initiated during a half cycle of supply conductor voltage when its anode voltage was positive for introducing into said control element circuit of said other of said pair of load current flow-controlling electric discharge devices a voltage which will initiate conduction thereof during the next half cycle of said supply conductor voltage when its anode voltage is positive, means for introducing into each of said control element circuits of said one of said pair of load current flow-controlling electric discharge device, voltages the simultaneous existence of which will initiate its conduction during half cycles of said supply conductor voltage when its anode voltage is positive, the supply of one of said voltages in one of said control element circuits being dependent on anode-cathode conduction of said other of said pair of load current flow-controlling electric discharge devices which was initiated during an immediately preceding half cycle of supply conductor voltage when its anode voltage was positive and the supply of the other of said voltages in the other of said control element circuits being dependent on the flow of consecutive half cycle pulses of rectified current in said load conductors, means responsive to half cycle pulses of current flow in said load conductors which are greater than a predetermined maximum for introducing into said control element circuit of said overload responsive electric discharge device a voltage which renders it conducting, means responsive to anode-cathode conduction of said overload responsive electric-discharge device for applying a hold off voltage in said other of said control element circuits of said one of said pair of load current flow controlling electric discharge devices, a timing capacitor and its parallel connected resistor connected in the control element circuit of said current initiating electric discharge device, means responsive to anode-cathode conduction of said other of said pair of load current flow-controlling electric discharge devices for charging said capacitor through the control element to cathode circuit of said current initiating electric discharge device to apply a negative hold off voltage in said circuit for a predetermined time interval after anode-cathode conduction of said other of said pair of load current flow-controlling electric discharge devices stops, and means for controlling the anode-cathode connection of said initiating electric discharge device and said one of said pair of load current flow-controlling electric discharge devices with said supply conductors.

18. Apparatus comprising alternating current supply conductors, load conductors, a full wave rectifier having input and output terminals, means connecting said load conductors with said output terminals of said rectifier, and means for controlling the flow of current from said supply conductors to said input terminals of said rectifier, said means including a pair of load current flow-controlling electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, an overload responsive electric discharge device having an anode, a cathode, a control element and a control element circuit which connects its said control elements with its said cathode, means connecting the anode-cathode circuits of said electric discharge devices with said supply conductors so that said one of said pair of load current flow-controlling electric discharge devices may conduct during half cycles of voltage of one polarity and the other of said pair of load current flow-controlling electric discharge devices and said overload responsive electric discharge device may conduct during immediately following half cycles of the opposite polarity, means responsive to anode-cathode conduction of said one of said pair of load current flow-controlling electric discharge devices which was initiated during a half cycle of supply conductor voltage when its anode voltage was positive for introducing into said control element circuit of said other of said pair of load current flow-controlling electric discharge devices a voltage which will initiate conduction thereof during the next half cycle of said supply conductor voltage when its anode voltage is positive, means for introducing into each of said control element circuits of said one of said pair of load current flow-controlling electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said pair of load current flow-controlling electric discharge devices which was initiated during an immediately preceding half cycle of supply conductor voltage when its anode voltage was positive and the supply of the other of said voltages in the other of said control element circuits being dependent on the flow of consecutive half cycle pulses of rectified current in said load conductors, means responsive to half cycle pulses of current flow in said load conductors which are greater than a predetermined maximum for introducing into said control element circuit of said overload responsive electric discharge device a voltage which renders it conducting, and means responsive to anode-cathode conduction of said overload responsive electric discharge device for applying a hold off voltage in said other of said control element circuits of said one of said pair of load current flow-controlling electric discharge devices.

19. Apparatus comprising alternating current supply conductors, load conductors, a full wave rectifier having input and output terminals, means connecting said load conductors with said output terminals of said rectifier, and means for controlling the flow of current from said supply conductors to said input terminals of said rectifier, said means including a current initiating electric discharge device having an anode, a cathode, two control elements and two control element circuits each of which connects a different one of its control elements with its cathode, a pair of load current flow controlling electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, a pair of control electric discharge devices one of which has an anode, a cathode, a control element and a control element circuit which connects its said control element with its said cathode and the other of which has an anode, a cathode, two control elements, and two control element circuits each of which connects a different one of its said control elements with its said cathode, means connecting the anode-cathode circuits of said electric discharge devices with said supply conductors so that said current initiating electric discharge device and said ones of said pairs of said electric discharge devices may conduct during half cycles of voltage of one polarity and the others of said pairs of said electric discharge devices may conduct during immediately following half cycles of the opposite polarity, means responsive to anode-cathode conduction of either one of said current initiating electric discharge devices and said one of said pair of load current flow-controlling electric discharge devices which was initiated during a half cycle of supply conductor voltage when its anode voltage was positive for introducing into said control element circuit of said other of said pair of load current flow-controlling electric discharge devices a voltage which will initiate conduction thereof during the next half cycle of said supply conductor voltage when its anode voltage is positive, means for introducing into each of said control element circuits of said one of said pair of load current flow-controlling electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said pair of load current flow controlling electric discharge devices which was initiated during an immediately preceding half cycle of supply conductor voltage when its anode voltage was positive and the supply of the other of said voltages in the other of said control element circuits being dependent on anode-cathode conduction of said other of said pair of control electric discharge devices which was initiated during an immediately preceding half cycle of supply conductor voltage when its anode voltage was positive, means responsive to anode-cathode conduction of said one of said pair of control electric discharge devices which was initiated during a half cycle of supply conductor voltage when its anode voltage was positive for introducing into said one control element circuit of said other of said pair of control electric discharge devices a voltage which releases it for conduction subject to the control voltage of its said other control element, means responsive to rectified half cycle pulses of current flow in said load conductors which are greater than a predetermined minimum value for introducing a control voltage in the control element circuit of said one of said pair of control electric discharge devices which renders it conducting and in the other of said pair of control element circuits of said other of said pair of control electric discharge devices which renders it conducting subject to its release for conduction by the voltage applied in its said one control element circuit, a timing capacitor and its parallel connected resistor connected in one of said control element circuits of said current initiating electric discharge device, means responsive to anode-cathode conduction of said other of said pair of load current flow-controlling electric discharge devices for charging said capacitor through said one control element to cathode circuit of said current initiating electric discharge device to apply a negative hold off voltage in said one control element circuit for a predetermined time interval after anode-cathode conduction of said other of said pair of load current flow-controlling electric discharge device stops, means for introducing into the other of said control element circuits of said current initiating electric discharge device a voltage which releases it for anode-cathode conduction only in the early part of its positive half cycle of anode voltage subject to the control voltage in its said one control element circuit, and means for controlling the anode-cathode connection of said current initiating electric discharge device and said one of said pair of load current flow-controlling electric discharge devices with said supply conductors.

20. Apparatus comprising alternating current supply conductors, load conductors, and means for controlling the flow of current from said supply conductors to said load conductors, said means including a pair of electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, means connecting the anode-cathode circuits of said electric discharge devices with said supply conductors so that said one of said electric discharge devices may conduct during half cycles of voltage of one polarity and the other of said electric discharge devices may conduct during immediately following half cycles of the opposite polarity, means responsive to anode-cathode conduction of said one of said electric discharge devices which was initiated during a half cycle of supply circuit voltage when its anode voltage was positive for introducing into said control element circuit of said other of said electric discharge devices a voltage which will initiate conduction of said other electric discharge device during the next half cycle of said supply conductor voltage when its anode voltage is positive, and means for introducing into each of said control element circuits of said one of said electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said electric discharge devices which was initiated during an immediately preceding half cycle of supply conductor voltage when its anode voltage was positive and the supply of the other of said voltages in the other of said control element circuits being dependent on consecutive half cycles of current flow from said supply conductors to said load conductors.

21. Apparatus comprising alternating current supply conductors, load conductors, and means for controlling the flow of current from said supply conductors to said load conductors, said means including a current initiating electric discharge device having an anode, a cathode, a control element and a control element circuit which connects its said control element with its said cathode, a pair of electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, means connecting the anode-cathode circuits of said electric discharge devices with said supply conductors so that said current initiating electric discharge device and said one of said pair of electric discharge devices may conduct during half cycles of voltage of one polarity and the other of said pair of electric discharge devices may conduct during immediately following half cycles of the opposite polarity, means responsive to anode-cathode conduction of either one of said current initiating electric discharge device and said one of said pair of electric discharge devices which was initiated during a half cycle of supply circuit voltage when its anode voltage was positive for introducing into said control element circuit of said other of said pair of electric discharge devices a voltage which will initiate conduction of said other electric discharge device during the next half cycle of said supply conductor voltage when its anode voltage is positive, means for introducing into each of said control element circuits of said one of said pair of electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said pair of electric discharge devices which was initiated during an immediately preceding half cycle of supply conductor voltage when its anode voltage was positive and the supply of the other of said voltages in the other of said control element circuits being dependent on consecutive half cycles of current flow from said supply conductors to said load conductors, a timing capacitor and its parallel connected resistor connected in the control element circuit of said current initiating electric discharge device, means responsive to anode-cathode conduction of said other of said pair of electric discharge devices for charging said capacitor through the control element to cathode circuit of said current initiating electric discharge device to apply a negative hold off voltage in said circuit for a predetermined time interval after anode-cathode conduction of said other of said pair of electric discharge device stops, and means for controlling the anode-cathode connection of said current initiating electric discharge device and said one of said pair of electric discharge devices with said supply conductors.

22. Apparatus comprising alternating current supply conductors, load conductors, and means for controlling the flow of current from said supply conductors to said load conductors, said means including a pair of load current flow-controlling electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, an overload responsive electric discharge device having an anode, a cathode, a control element and a control element circuit which connects its said control elements with its said cathode, means connecting the anode-cathode circuits of said electric discharge devices with said supply conductors so that said one of said pair of load current flow-controlling electric discharge devices may conduct during half cycles of voltage of one polarity and the other of said pair of load current flow-controlling electric discharge devices and said overload responsive electric discharge device may conduct during immediately following half cycles of the opposite polarity, means responsive to anode-cathode conduction of said one of said pair of load current flow-controlling electric discharge devices which was initiated during a half cycle of supply conductor voltage when its anode voltage was positive for introducing into said control element circuit of said other of said pair of load current flow-controlling electric discharge devices a voltage which will initiate conduction thereof during the next half cycle of said supply conductor voltage when its anode voltage is positive, means for introducing into each of said control element circuits of said one of said pair of load current flow-controlling electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said pair of load current flow-controlling electric discharge devices which was initiated during an immediately preceding half cycle of supply conductor voltage when its anode voltage was positive and the supply of the other of said voltages in the other of said control element circuits being dependent on consecutive half cycles of current flow from said supply conductors to said load conductors, means responsive to half cycle pulses of current flow in said load conductors which are greater than a predetermined maximum for introducing into said control element circuit of said overload responsive electric discharge device a voltage which renders it conducting, and means responsive to anode-cathode conduction of said overload responsive electric discharge device for applying a hold off voltage in said other of said control element circuits of said one of said pair of load current flow-controlling electric discharge devices.

23. Apparatus comprising alternating current supply conductors, load conductors, and means for controlling the flow of current from said supply conductors to said load conductors, said means including a pair of load current flow-controlling electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, an overload responsive electric discharge device having an anode, a cathode, a control element and a control element circuit which connects its said control elements with its said cathode, a frequency of overload responsive electric discharge device having an anode, a cathode, a control element and a control element circuit which connects its said control element with its said cathode. means connecting the anode-cathode circuits of said electric discharge devices with said supply conductors so that said one of said pair of load current flow-controlling electric discharge devices may conduct during half cycles of voltage of one polarity and the other of said pair of load current flow-controlling electric discharge devices, said overload responsive electric discharge device, and said frequency of overload responsive electric discharge device may conduct during immediately following half cycles of the opposite polarity, means responsive to anode-cathode conduction of said one of said pair of load current flow-controlling electric discharge devices which was initiated during a half cycle of supply conductor voltage when its anode voltage was positive for introducing into said control element circuit of said other of said pair of load current flow controlling electric discharge devices a voltage which will initiate conduction thereof during the next half cycle of said supply conductor voltage when its anode voltage is positive, means for introducing into each of said control element circuits of said one of said pair of load current flow-controlling electric discharge devices, voltage the simultaneous existence of which will initiate its conduction during half cycles of said supply conductor voltage when its anode voltage is positive, the supply of one of said voltages in one of said control element circuits being dependent on anode-cathode conduction of said other of said pair of load current flow-controlling electric discharge devices which was initiated during an immediately preceding half cycle of supply conductor voltage when its anode voltage was positive and the supply of the other of said voltages in the other of said control element circuits being dependent on consecutive half cycles of current flow from said supply conductors to said load conductors, means responsive to half cycle pulses of current flow in said load conductors which are greater than a predetermined maximum for introducing into said control element circuit of said overload responsive electric discharge device a voltage which renders it conducting, means responsive to anode-cathode conduction of said overload responsive electric discharge device for applying a hold off voltage in said other of said control element circuits of said one of said pair of load current flow-controlling electric discharge devices, bias voltage means connected in said control element circuit of said frequency of overload responsive electric discharge device for applying a voltage which controls its anode-cathode conductively, a control voltage capacitor also connected in said control element circuit of said frequency of overload responsive electric discharge device, a storage capacitor, means including a rectifier for charging said storage capacitor in response to anode-cathode conduction of said overload responsive electric discharge device, an adjustable discharge circuit connected across said storage capacitor, a charging circuit for said control voltage capacitor also connected across said storage capacitor for charging it to a polarity which after a time delay reverses the voltage in said control element circuit of said frequency of overload responsive electric discharge device from that provided by said bias voltage means, and means responsive to conduction and non-conduction of said frequency of overload responsive electric discharge device for altering said bias voltage to increase its value of that polarity which produced its conduction or nonconduction.

24. Apparatus comprising alternating current supply conductors, load conductors, and means for controlling the flow of current from said supply conductors to said load conductors, said means including a first pair of electric discharge devices one of which has an anode, a cathode, two control elements and two control element circuits each of which connects a different one of its said control elements with its said cathode and the other of which has an anode, a cathode, a control element and a control element circuit which connects its said control element with its said cathode, a second pair of electric discharge devices one of which has an anode, a cathode, a control element and a control element circuit which connects its said control element with its said cathode and the other of which has an anode, a cathode, two control elements, and two control element circuits each of which connects a different one of its said control elements with its said cathode, means connecting the anode-cathode circuits of said pairs of electric discharge devices with said supply conductors so that said ones of said pairs of said electric discharge devices may conduct during half cycles of voltage of one polarity and the others of said pairs of said electric discharge devices may conduct during immediately following half cycles of the opposite polarity, means responsive to anode-cathode conduction of said one of said first pair of electric discharge devices which was initiated during a half cycle of supply conductor voltage when its anode voltage was positive for introducing into said control element circuit of said other of said first pair of electric discharge devices a voltage which will initiate conduction of said other of said first pair of electric discharge devices during the next half cycle of said supply conductor voltage when its anode voltage is positive, means for introducing into each of said control element circuits of said one of said first pair of electric discharge devices, voltages the simultaneous existence of which will initiate its conduction during half cycles of said supply conductor voltage when its anode voltage is positive, the supply of one of said voltages in one of said control element circuits being dependent on anode-cathode conduction of said other of said first pair of electric discharge devices which was initiated during an immediately preceding half cycle of supply conductor voltage when its anode voltage was positive and the supply of the other of said voltages in the other of said control element circuits being dependent on anode-cathode conduction of said other of said second pair of electric discharge devices which was initiated during an immediately preceding half cycle of supply conductor voltage when its anode voltage was positive, means responsive to anode-cathode conduction of said one of said second pair of electric discharge devices which was initiated during a half cycle of supply conductor voltage when its anode voltage was positive for introducing into said one control element circuit of said other of said second pair of electric discharge devices a voltage which releases it for conduction subject to the control voltage of its said other control element, and means responsive to half cycle pulses of current flow in said load conductors which are greater than a predetermined minimum value for introducing a control voltage in the control element circuit of said one of said second pair of electric discharge devices which renders it conducting and in the other of said pair of control element circuits of said other of said second pair of electric discharge devices which renders it conducting subject to its release for conduction by the above-mentioned voltage applied in its said one control element circuit.

MAURICE E. BIVENS.

REFERENCES CITED

The following references are of record in the file of this patent:

UNITED STATES PATENTS

| Number | Name | Date |
| --- | --- | --- |
| 1,976,569 | Levy | Oct. 9, 1934 |
| 2,060,471 | Rose | Nov. 10, 1936 |
| 2,123,859 | Winograd | July 12, 1938 |
| 2,142,546 | Winograd | Jan. 3, 1939 |
| 2,434,214 | Lerstrup | Jan. 6, 1948 |